United States Patent
Aoyagi

(10) Patent No.: US 8,869,604 B2
(45) Date of Patent: Oct. 28, 2014

(54) FLOW RATE DETECTION DEVICE

(75) Inventor: Shinsuke Aoyagi, Zama (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 21 days.

(21) Appl. No.: 13/820,916

(22) PCT Filed: Sep. 8, 2010

(86) PCT No.: PCT/JP2010/065413
§ 371 (c)(1),
(2), (4) Date: Mar. 5, 2013

(87) PCT Pub. No.: WO2012/032617
PCT Pub. Date: Mar. 15, 2012

(65) Prior Publication Data
US 2013/0167626 A1    Jul. 4, 2013

(51) Int. Cl.
| | | |
|---|---|---|
| G01M 15/00 | (2006.01) |
| G01F 1/68 | (2006.01) |
| G01F 1/692 | (2006.01) |
| G01F 15/04 | (2006.01) |
| G01F 1/684 | (2006.01) |
| G01F 1/696 | (2006.01) |
| G01F 1/69 | (2006.01) |
| G01F 1/72 | (2006.01) |

(52) U.S. Cl.
CPC ....... *G01F 1/69* (2013.01); *G01F 1/692* (2013.01); *G01F 15/046* (2013.01); *G01F 1/6845* (2013.01); *G01F 1/696* (2013.01); *G01F 1/72* (2013.01)

USPC ............ 73/114.34; 73/204.26; 701/104

(58) Field of Classification Search
None
See application file for complete search history.

(56) References Cited

U.S. PATENT DOCUMENTS

| 5,343,745 A | 9/1994 | Tomisawa |
| 5,750,889 A | 5/1998 | Kowatari et al. |

(Continued)

FOREIGN PATENT DOCUMENTS

| JP | 2-69721 U | 5/1990 |
| JP | 7-29419 U | 6/1995 |

(Continued)

OTHER PUBLICATIONS

Extended European Search Report issued May 16, 2014 in European Patent Application No. 10856967.4.

(Continued)

*Primary Examiner* — Harshad R Patel
(74) *Attorney, Agent, or Firm* — Sughrue Mion, PLLC

(57) ABSTRACT

A flow rate detection device of the invention comprises a flow rate meter 11 for outputting an output value Vd depending on a gas flow rate and detects the gas flow rate by calculating the gas flow rate on the basis of the output value output from the flow rate meter. In this invention, it is judged if the output value output from the flow rate meter should be corrected on the basis of the flow rate of the gas passing through the flow rate meter and its change rate. When it is judged that the output value output from the flow rate meter should be corrected, the output value output from the flow rate meter is corrected and then, the gas flow rate is calculated on the basis of this corrected output value.

6 Claims, 10 Drawing Sheets

(56) References Cited

U.S. PATENT DOCUMENTS

| | | |
|---|---|---|
| 5,987,997 A | 11/1999 | Roskam et al. |
| 2002/0114732 A1 | 8/2002 | Vyers |
| 2013/0054122 A1* | 2/2013 | Aoyagi ......................... 701/104 |
| 2014/0058646 A1* | 2/2014 | Shimada et al. .............. 701/104 |
| 2014/0074379 A1* | 3/2014 | Aoyagi ......................... 701/104 |

FOREIGN PATENT DOCUMENTS

| | | | |
|---|---|---|---|
| JP | 8-62012 A | 3/1996 | |
| JP | 2008-2833 A | 1/2008 | |
| JP | 2008-26203 A | 2/2008 | |
| WO | 02/065078 A1 | 8/2002 | |

OTHER PUBLICATIONS

Extended European Search Report issued Jul. 15, 2014 in European Patent Application No. 10856967.4.

\* cited by examiner

FLOW RATE DETECTION DEVICE

CROSS REFERENCE TO RELATED APPLICATIONS

This application is a National Stage of International Application No. PCT/JP2010/065413, filed on Sep. 8, 2010, the contents of all of which are incorporated herein by reference in their entirety.

TECHNICAL FIELD

The invention relates to a flow rate detection device.

BACKGROUND ART

In an internal combustion engine, it is known that when the air to be suctioned into a combustion chamber flows through an intake passage, a so-called pulsation occurs in the air. In the case where the exhaust gas discharged from the combustion chamber to the exhaust passage is introduced into the intake passage, the pulsation occurring in the air flowing through the intake passage becomes large.

In the case where the pulsation occurs in the air flowing through the intake passage, the air flow direction changes between the forward direction (i.e. the direction toward the combustion chamber) and the backward direction (i.e. the direction opposite to the forward direction). Recently, for example, in order to decrease emissions discharged from the engine, it is desired that the flow rate of the air flowing through the intake passage in the backward direction as well as that in the forward direction are detected.

A flow rate detection device for detecting the flow rate of the fluid flowing in the backward direction as well as that in the forward direction is described in the Patent Document 1. This device is a so-called silicon chip type flow rate measurement device and has a heating resistor and two temperature detectors. One of the detectors detects the temperature of the air coming thereto (hereinafter, this detector will be referred to as—fluid temperature detector—) and the other detector detects the temperature of the heating resistor (hereinafter, this detector will be referred to as—heating resistor temperature detector—). In this device, the temperature higher than the fluid temperature detected by the fluid temperature detector by a constant temperature is set as a base temperature, it can be judged if the fluid passing through the device flows in the forward or backward direction on the basis of the relationship between the base temperature and the heating resistor temperature detected by the heating resistor temperature detector and the flow rate of the air passing through the device can be measured on the basis of the difference between the base temperature and the heating resistor temperature detected by the heating resistor temperature detector.

Therefore, if the device described in the Patent Document 1 is positioned in the intake passage of the engine, the flow rate of the air flowing through the intake passage in the backward direction as well as that in the forward direction can be detected.

PRIOR TECHNICAL DOCUMENT

Patent Document

[Patent Document 1] JP 2001-193505 A
[Patent Document 2] JP H02-69721 A
[Patent Document 3] JP 2008-26203 A

DISCLOSURE OF THE INVENTION

Problem to be Solved by the Invention

When the pulsation occurs in the air flowing through the intake passage of the engine, as explained above, the direction of the air flowing through the intake passage changes between the forward and backward directions. When the flow direction of the air flowing through the intake passage changes from the forward direction to the backward direction, the air flow rate gradually decreases from the relatively large flow rate while the air flows through the intake passage in the forward direction, the air flow rate instantaneously becomes zero when the air flow direction has changed from the forward direction to the backward direction and the air flow rate gradually becomes relatively large from zero after the air flow direction changes to the backward direction. On the other hand, when the flow direction of the air flowing through the intake passage changes from the backward direction to the forward direction, the flow rate gradually decreases from the relatively large flow rate while the air flows through the intake passage in the backward direction, the flow rate instantaneously becomes zero when the air flow direction has changed from the backward direction to the forward direction and the flow rate gradually increases from zero after the air flow direction changes to the forward direction. That is, when the flow direction of the air flowing through the intake passage changes between the forward and backward directions, the flow rate of the air flowing through the intake passage decreases to zero and thereafter, the flow rate increases.

It is known that when the fluid flow rate is relatively large, the fluid flows under the turbulent condition and when the fluid flow rate is relatively small, the fluid flows under the laminar condition. Therefore, as explained above, when the pulsation occurs in the air flowing through the intake passage and therefore, the air flow direction changes from the forward direction to the backward direction, the air flow changes from the turbulent condition in the forward direction to laminar condition in the forward direction, then, to the laminar condition in the backward direction and the, the turbulent condition in the backward direction. On the other hand, when the pulsation occurs in the air flowing the intake passage and therefore, the air flow direction changes from the backward direction to the forward direction, the air flow direction changes from the turbulent condition in the backward direction, then, to the laminar condition in the forward direction and then, the turbulent condition in the forward direction.

Therefore, in order to measure the air flowing through the intake passage by the flow rate detection device described in the Patent Document 1, the device must be able to accurately measures the flow rate of the air flowing in the forward direction under the turbulent condition, that flowing in the forward direction under the laminar condition, that flowing in the backward direction under the turbulent condition and that flowing in the backward direction under the laminar condition.

As explained above, the device described in the Patent Document 1 judges if the fluid passing through the device flows in the forward or backward direction on the basis of the relationship between the base temperature and the heating resistor temperature detected by the heating resistor temperature detector and measures the flow rate of the air passing through the device on the difference between the base temperature and the heating resistor temperature detected by the heating resistor temperature detector (hereinafter, this difference will be referred to as—temperature difference relative to the base temperature—).

Even when the flow direction of the fluid passing through the device of the Patent Document 1 is constant (i.e. one of the forward and backward directions), the heat amounts removed from the heating resistor by the fluid under the turbulent and laminar conditions are different from each other. Therefore, in case where the flow rate is obtained by converting the temperature difference relative to the base temperature obtained when the fluid passes through the device under the turbulent condition, using a conversion coefficient (i.e. a conversion coefficient for converting the temperature difference relative to the base temperature) on the basis of the temperature difference relative to the base temperature obtained when the fluid passes through the device under the laminar condition, this obtained flow rate is not accurate. On the other hand, in case where the flow rate is obtained by converting the temperature difference relative to the base temperature obtained when the fluid passes through the device under the laminar condition, using a conversion coefficient on the basis of the temperature difference relative to the base temperature obtained when the fluid passes through the device under the turbulent condition, this obtained flow rate is not accurate.

Further, even when the flow condition of the fluid passing through the device of the Patent Document 1 is constant (i.e. one of the turbulent and laminar conditions), the heat amounts removed from the heating resistor by the fluid in the forward and backward directions are different from each other. Therefore, in case where the flow rate is obtained by converting the temperature difference relative to the base temperature obtained when the fluid passes through the device in the forward direction, using a conversion coefficient on the basis of the temperature difference relative to the base temperature obtained when the fluid passes through the device in the backward direction, this obtained flow rate is not accurate. On the other hand, in case where the flow rate is obtained by converting the temperature difference relative to the base temperature obtained when the fluid passes through the device in the backward direction, using a conversion coefficient on the basis of the temperature difference relative to the base temperature obtained when the fluid passes through the device in the forward direction, this obtained flow rate is not accurate.

In general, in order to accurately detect the fluid flow rate by the device of the Patent Document 1 independently of the flow direction and condition of the fluid, the conversion coefficient for converting the temperature difference relative to the base temperature obtained when the fluid passes through the device in the forward direction under the turbulent condition, that when the fluid passes through the device in the forward direction under the laminar condition, that when the fluid passes through the device in the backward direction under the turbulent condition and that when the fluid passes through the device in the backward direction under the laminar condition are prepared These conversion coefficients are prepared for converting the temperature difference relative to the base temperature to the accurate flow rate on the basis of the relationship between the temperature difference relative to the base temperature obtained when the flow rate and the flow direction of the fluid passing through the device change variously and the flow rate of the fluid passing through the device. The relationship between the temperature difference relative to the base temperature and the flow rate of the fluid passing through the device is one obtained under the condition the flow direction and the flow rate of the fluid passing through the device are maintained constant. Therefore, in the case where the flow rate change of the fluid passing through the device is small, that is, in the case where the fluid flow direction does not change from the forward direction to the backward direction or vice versa and the fluid condition does not change from the turbulent condition to the laminar condition or vice versa, the flow rate obtained by converting the temperature difference relative to the base temperature, using the above-mentioned prepared conversion coefficients is accurate.

However, in the case where the flow rate is obtained by converting the temperature difference relative to the base temperature, using the above-mentioned prepared conversion coefficients while the flow rate change of the fluid passing through the device is large and therefore, the fluid flow direction changes from the forward direction to the backward direction or vice versa, this obtained flow rate is not accurate and in the case where the flow rate is obtained by converting the temperature difference relative to the base temperature, using the above-mentioned prepared conversion coefficients while the fluid condition changes from the turbulent condition to the laminar condition, this obtained flow rate is not accurate.

That is, in the case where the flow rate is calculated by converting the temperature difference relative to the base temperature, using the above-mentioned prepared conversion coefficients, the accurate flow rate is calculated when the flow condition is the constant condition where the flow rate change of the fluid passing through the device is relatively small, however, the accurate flow rate is not calculated when the flow condition is the transient condition where the flow rate change of the fluid passing through the device is relatively large.

The object of this invention is to accurately detect the flow rate of the fluid under the transient condition.

Means for Solving the Problem

The first invention of this application relates to a flow rate detection device comprising a flow rate meter for outputting an output value depending on a flow rate of a gas and for detecting the flow rate of the gas by calculating the flow rate of the gas on the basis of the output value output from the flow rate meter. In the flow rate detection device of the invention, it is judged if the output value output from the flow rate meter should be corrected on the basis of the flow rate of the gas passing through the flow rate meter and the change rate of the flow rate. When it is judged that the output value output from the flow rate meter should be corrected, the output value output from the flow rate meter is corrected and then, the flow rate of the gas is calculated on the basis of the corrected output value.

According to this invention, the following technical effect can be obtained. The gas flows under the laminar or turbulent condition, depending on the flow rate of the gas. In this regard, it has been realized by the study of the inventor of this application that the output property of the flow rate meter when the gas condition has changed from the laminar condition to the turbulent condition (and the output property of the flow rate meter until a predetermined time has elapsed from when the gas condition has changed from the laminar condition to the turbulent condition) is different from that when the gas is constantly under the turbulent condition. It has bee also realized by the study of the inventor of this application that the output property of the flow rate meter when the gas condition has changed from the turbulent condition to the laminar condition (and the output property of the flow rate meter until a constant time has elapsed from when the gas condition has changed from the turbulent condition to the laminar condition) is different from that when the gas is constantly under the laminar condition.

Further, the flow direction of the gas passing through the flow rate meter may invert. In this regard, it has been realized by the study of the inventor of this application that the output property of the flow rate meter when the flow rate of the gas passing through the flow rate meter inverts from a certain direction to the direction opposite thereto (and the output property of the flow meter until a constant time has elapsed from when the gas flow direction has inverted) is different from that when the gas is constantly under the above-mentioned opposite flow direction.

Therefore, in order to make the flow rate detection device accurately detect the gas flow rate when the gas condition has changed from the laminar condition to the turbulent condition (or until a constant time has elapsed from when the gas condition has changed from the laminar condition to the turbulent condition), when the gas condition has changed from the laminar condition to the turbulent condition (or until the constant time has elapsed from the gas condition change), it is preferred that the gas flow rate is detected by handling the output value from the flow rate meter in a manner different from that when the gas is constantly under the turbulent condition. Further, in order to make the device accurately detect the gas flow rate when the gas condition has changed from the turbulent condition to the laminar condition (or until a constant time has elapsed from when the gas condition has changed from the turbulent condition to the laminar condition), when the gas condition has changed from the turbulent condition to the laminar condition (or until the constant time has elapsed from the gas condition change), it is preferred that the gas flow rate is detected, handling the output value from the flow rate meter in a manner different from that when the gas is constantly under the laminar condition. Further, when the gas flow direction has inverted (or until the constant time has elapsed from when the gas flow direction has inverted), it is preferred that the gas flow rate is detected, handling the output value from the flow rate meter in a manner different from that when the gas is constantly under the direction after the inversion.

In this regard, it has been realized by the study of the inventor of this application that whether the change of the gas condition from the laminar condition to the turbulent condition or vice versa or the gas flow direction inversion occurs depends on the gas flow rate and the change rate thereof.

In this invention, it is judged if the output value from the flow rate meter should be corrected on the basis of the flow rate of the gas passing through the flow rate meter and its change rate. When it is judged that the output value from the flow rate meter should be corrected, that is, the flow rate of the gas passing through the flow rate meter and its change rate are considered, it has been realized that the change of the gas condition from the laminar condition to the turbulent condition or vice versa occurs (or such a change has occurred or will occur) or the gas flow direction inverts (or has inverted or will invert) and as a result, it has been realized that the output value from the flow rate meter should be handled in a manner different from that when the gas is constantly under the turbulent or laminar condition or under a constant flow direction, the output value from the flow rate meter is corrected and then, the gas flow rate is calculated on the basis of this corrected output value.

Therefore, according to this invention, the technical effect that even when the gas condition has changed from the laminar condition to the turbulent condition or vice versa and the gas flow direction has inverted, that is, the gas is under the transient condition, the gas flow rate can be accurately calculated by the flow rate detection device, can be obtained.

In particular, in the case where the flow rate detection device of this invention is used for detecting the flow rate of the air suctioned into the combustion chamber of the internal combustion engine, even when the flow rate of the air suctioned into the combustion chamber is not constant and the air flow rate increases or decreases transiently or the air flow direction changes from the forward direction (i.e. the direction toward the combustion chamber) to the backward direction (i.e. the direction opposite to the forward direction) or vice versa, according to the flow rate detection device of this invention, the technical effect that the air flow rate is accurately calculated can be obtained.

In the second invention of this application in the device of the first invention, it is judged if the condition of the gas passing through the flow rate meter has changed from the laminar condition to the turbulent condition or vice versa or the flow direction of the gas passing through the flow rate meter has inverted on the basis of the flow rate of the gas passing through the flow rate meter and its change rate. When it is judged that the condition of the gas passing through the flow rate meter has changed from the laminar condition to the turbulent condition or vice versa or the flow direction of the air passing through the flow rate meter has inverted, it is judged that the output value output from the flow rate meter should be corrected.

According to this invention, the following technical effect can be obtained. As explained above, the output properties of the flow rate meter when the gas condition has changed from the laminar condition to the turbulent condition and vice versa are different from those when the gas is constantly under the turbulent and laminar conditions, respectively. Further, the output property of the flow rate meter when the gas flow direction has changed from a direction to the direction opposite thereto is different from that when the gas is constantly under the above-mentioned opposite direction. Therefore, in order to detect the gas flow rate accurately by the flow rate detection device, it should be surely realized that the gas condition has changed from the laminar condition to the turbulent condition or vice versa or the gas flow direction has inverted and when this matter has been realized, the output value from the flow rate meter should be corrected and then, the gas flow rate should be calculated on the basis of this corrected output value.

In this regard, in this invention, it is judged that the output value from the flow rate meter should be corrected due to the fact that the condition of the gas passing through the flow rate meter has changed from the laminar condition to the turbulent condition or vice versa or the gas flow direction has inverted. Therefore, when it has been surely realized that the gas condition has changed from the laminar condition to the turbulent condition or vice versa or the gas flow direction has inverted, the output value from the flow rate meter and the, the gas flow rate is calculated on the basis of this corrected output value.

Therefore, according to this invention, the technical effect that the gas flow rate is accurately calculated by the flow rate detection device even when the gas condition has changed from the laminar condition to the turbulent condition or vice versa or the gas flow direction has inverted, can be obtained.

In the third invention of this application according to the flow rate detection device of the second invention, a point defined by the flow rate of the gas passing through the flow rate meter and its increase rate when the condition of the gas passing through the flow rate meter has changed from the laminar condition to the turbulent condition is previously obtained as a flow rate increase condition transition point. In addition, a point defined by the flow rate of the gas passing through the flow rate meter and its decrease rate when the condition of the gas passing through the flow rate meter has changed from the turbulent condition to the laminar condition is previously obtained as a flow rate decrease condition transition point. Then, it is judged if the point defined the flow rate and its increase rate is the flow rate increase condition transition point when the flow rate of the gas passing through the flow rate meter increases. When it is judged that the point defined by the flow rate of the gas passing through the flow rate meter and its increase rate is the flow rate increase condition transition point, it is judged that the condition of the gas passing through the flow rate meter has changed from the laminar condition to the turbulent condition. On the other hand, it is judged if the point defined by the flow rate and its decrease rate is the flow rate decrease condition transition point when the flow rate of the gas passing through the flow rate meter decreases. When it is judged that the point defined by the flow rate of the gas passing through the flow rate meter and its decrease rate is the flow rate decrease condition transition point, it is judged that the condition of the gas passing through the flow rate meter has changed from the turbulent condition to the laminar condition.

According to this invention, the following technical effect is obtained. As explained above, the gas flows under the laminar or turbulent condition, depending on the flow rate of the gas. In particular, when the gas flow rate is relatively small, the gas flows under the laminar condition and on the other hand, when the gas flow rate is relatively large, the gas flows under the turbulent condition. Therefore, the change of the gas condition from the laminar condition to the turbulent condition occurs when the gas flow rate increases and on the other hand, the change of the gas condition from the turbulent condition to the laminar condition occurs when the gas flow rate decreases.

In this invention, the point defined by the gas flow rate and its increase rate when the gas condition has changed from the laminar condition to the turbulent condition is previously obtained as the flow rate increase condition transition point. That is, when the point defined by the flow rate and its increase rate reaches the flow rate increase condition transition point when the gas flow rate increases, the change of the gas condition from the laminar condition to the turbulent condition occurs. In this invention, it is judged if the condition of the gas passing through the flow rate meter has changed from the laminar condition to the turbulent condition on the basis of whether the point defined by the gas flow rate and its increase rate reaches the flow rate increase condition transition point when the flow rate of the gas passing through the flow rate meter increases. Thereby, the technical effect that the change of the gas condition from the laminar condition to the turbulent condition can be simply and surely realized, can be obtained.

Further, in this invention, the point defined by the gas flow rate and its decrease rate when the gas condition has changed from the turbulent condition to the laminar condition is previously obtained as the flow rate decrease condition transition point. That is, when the point defined by the gas flow rate and its decrease rate reaches the flow rate decrease condition transition point when the gas flow rate decreases, the change of the gas condition from the turbulent condition to the laminar condition occurs. In this invention, it is judged if the condition of the gas passing through the flow rate meter has changed from the turbulent condition to the laminar condition on the basis of whether the point defined by the gas flow rate and its decrease rate reaches the flow rate decrease condition transition point when the flow rate of the gas passing through the flow rate meter decreases. Thereby, the technical effect that the change of the gas condition from the turbulent condition to the laminar condition can be simply and surely realized, can be obtained.

In the fourth invention of this application according to the device of any of the first to third inventions, a relationship between the output value output from the flow rate meter and the current gas flow rate when the change rate of the gas flow rate is zero or generally zero is previously obtained. The gas flow rate is calculated from the previously obtained relationship on the basis of the output value output from the flow rate meter and the corrected output value.

According to this invention, the following technical effect is obtained. In this invention, the relationship between the output value output from the flow rate meter and the gas flow rate when the change rate of the gas flow rate is zero or generally zero, that is, when the gas flow direction is constantly a direction or a direction opposite thereto and the gas is constantly under the laminar or turbulent condition, is previously obtained. When it is not judged that the output value from the flow rate meter should be corrected, the gas flow rate is calculated from the previously-obtained relationship, using the original output value from the flow rate meter. On the other hand, when it is judged that the output value from the flow rate meter should be corrected, the output value from the flow rate meter is corrected and then, the gas flow rate is calculated from the previously-obtained relationship, using this corrected output value. That is, in the case where the output value from the flow rate meter should be corrected, the gas flow rate can be calculated, using the previously-obtained relationship used when it is unnecessary to correct the output value from the flow rate meter.

Thus, without obtaining the relationship between the output value output from the flow rate meter and the gas flow rate when the change rate of the gas flow rate is relatively large or the gas flow direction inverts, the relationship between the output value output from the flow rate meter and the gas flow rate when the change rate of the gas flow rate is zero or generally zero can be used. Therefore, according to this invention, the technical effect that the gas flow rate can be accurately calculated when the gas condition has changed from the laminar condition to the turbulent condition or vice versa or the gas flow direction has inverted, without largely changing the constitution of the flow rate detection device for calculating the gas flow meter, using the relationship between the output value output from the flow rate meter and the gas flow rate when the change of the gas flow rate is zero or generally zero.

In the fifth invention of this application according to the flow rate detection device of any of the first to fourth inventions, the correction degree relative to the output value output from the flow rate meter when the output is corrected is determined, depending on at least one of the flow rate of the air passing through the flow rate meter and the change rate of the flow rate.

According to this invention, the following technical effect is obtained. It has been realized by the study of the inventor of this application that the degree of the difference of the output property of the flow rate meter when the gas condition has changed from the laminar condition to the turbulent condition (and the output property of the meter until a constant time has elapsed from that change) relative to that when the gas is constantly under the turbulent condition, the degree of the difference of the output property of the meter when the gas condition has changed from the turbulent condition to the laminar condition (and the output property of the meter until a constant time has elapsed from that change) relative to that when the gas is constantly under the laminar condition, and the degree of the difference of the output property of the meter when the gas flow direction has inverted (and the output property of the meter until a constant time has elapsed from that inversion) relative to that when the gas flows constantly in one direction are determined by the gas flow rate and its change rate.

In this invention, the correction degree relative to the output value from the meter when the output value is corrected, is determined, depending on at least one of the flow rate of the gas passing through the meter and its change rate. Therefore, according to this invention, the technical effect is obtained that the gas flow rate can be accurately calculated by the flow rate detection device when the gas condition has changed from the laminar condition to the turbulent condition or vice versa or the gas flow direction has inverted.

In the sixth invention of this application according to the device of any of the first to fifth inventions, the first order lag is eliminated before the output value output from the flow rate meter is corrected. Then, when it is judged that the output value output from the flow rate meter should be corrected, the output value after its first order lag is eliminated, is corrected and then, the gas flow rate is calculated on the basis of the corrected output value.

In the seventh invention of this application according to the device of any of the first to sixth inventions, the flow rate meter is a silicon chip type flow rate meter.

According to this invention, the following technical effect is obtained. The silicon chip type flow rate meter generally has an advantageous property that its size is small and its consumption electric power amount is small. The silicon chip type flow rate meter also has an advantageous property that the output responsiveness relative to the change of the gas flow rate to be detected is high.

So-called pulsation occurs in the air suctioned into the combustion chamber of the engine and therefore, the air flow direction changes with an extreme short cycle between the forward direction (i.e. the direction toward the combustion chamber) and the backward direction (i.e. the direction opposite to the forward direction). In the case where the pulsation occurs in the air suctioned into the combustion chamber, the flow rate of the air flowing in the forward direction decreases to zero, just thereafter, the flow direction of the air changes to the backward direction, thereafter, once the flow rate of the air flowing in the backward direction increases, it decreases to zero, thereafter, the flow direction of the air changes to the forward direction, thereafter, once the flow rate of the air flowing in the forward direction increases, it decreases to zero, just thereafter, the flow direction of the air changes to the backward direction, again and thereafter, such a change of the air flow rate and the change of the air flowing direction occur repeatedly with an extremely short cycle. Therefore, in order to accurately detect the flow rate of the air suctioned into the combustion chamber of the engine, the flow rate detection device is needed to accurately detect the air flow rate even when the output responsiveness relative to the air flow rate change is high and the air condition is under so-called transient condition where the air flow rate (and its flow direction) changes largely. The flow rate meter of the flow rate detection device of this invention is the silicon chip type flow rate meter where the output responsiveness relative to the gas flow rate change is high and the flow rate detection device of this invention can accurately detect the gas flow rate on the basis of the suitably corrected output value of the flow rate meter even when the gas is under the transient condition where the gas flow rate (and its flow direction) largely changes and therefore, in the case where the flow rate detection device of this invention is used for detecting the flow rate of the air suctioned into the combustion chamber of the engine, the technical effect that the flow rate of the air suctioned into the combustion chamber can be accurately detected, is obtained.

In the eighth invention of this application according to the device of any of the first to seventh inventions, the device comprises a heating resistor which generates a heat by the application of the electric voltage thereto, the electric voltage is applied to the resistor, depending on the heat amount removed from the resistor by the gas passing through the meter, and the meter outputs the output value depending on the heat amount removed from the resistor by the gas passing through the meter.

According to this invention, the following technical effect is obtained. The heat amounts removed from the heating resistor element by the air under the laminar and turbulent conditions are different from each other. Therefore, in the case where the flow rate meter outputs an output value depending on the heat amount removed from the heating resistor element by the air passing through the meter, the output property of the meter is relatively largely subject to the influence of the condition change of the air to be detected from the laminar condition to the turbulent condition or vice versa.

In this regard, in this invention, when the condition of the air to be detected has changed from the laminar condition to the turbulent condition or vice versa, the output value from the flow rate meter is appropriately corrected and then, the air flow rate is calculated on the basis of this corrected output value. Therefore, the technical effect that the air flow rate is accurately detected even by the flow rate detection device comprising the flow rate meter for outputting an output value depending on the heat amount removed from the heating resistor element by the air passing through the flow rate meter, is obtained.

MODE FOR CARRYING OUT THE INVENTION

Figure 1:
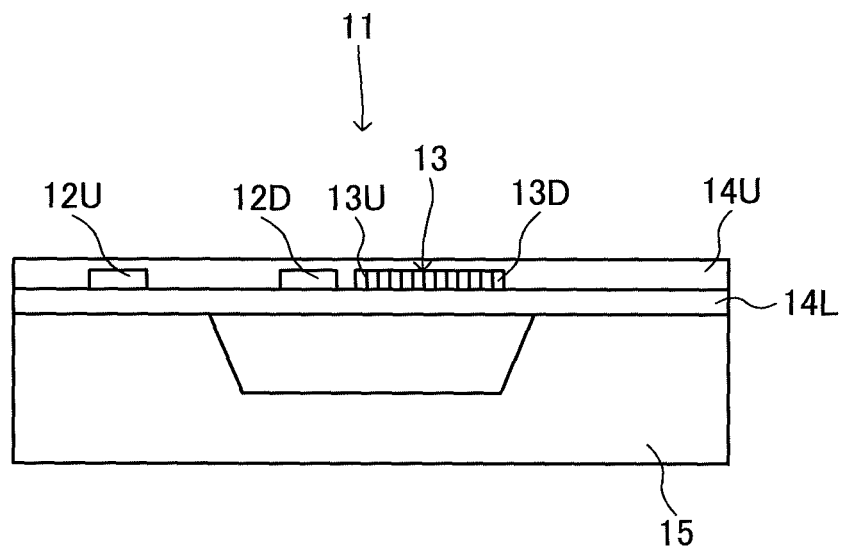
FIG. 1 is a view showing an air flow meter of a flow rate detection device of the embodiment of the invention.

Below, an embodiment of a flow rate detection device of the invention will be explained, referring to the drawings. The device of this embodiment has an air flow meter 11 of FIG. 1. This air flow meter 11 is, for example, positioned in an intake passage of an internal combustion engine 20 of FIG. 3. The device outputs an output value corresponding to a flow rate of an air suctioned from an inlet of the passage 30 into the passage 30 and passing through the air flow meter 11 (i.e. a flow rate of the air suctioned into the combustion chamber 21 of the engine 20). The air flow meter 11 is connected to an electronic control unit 60 of the engine 20 and the output value output from the air flow meter 11 is input into the unit 60.

Figure 3:
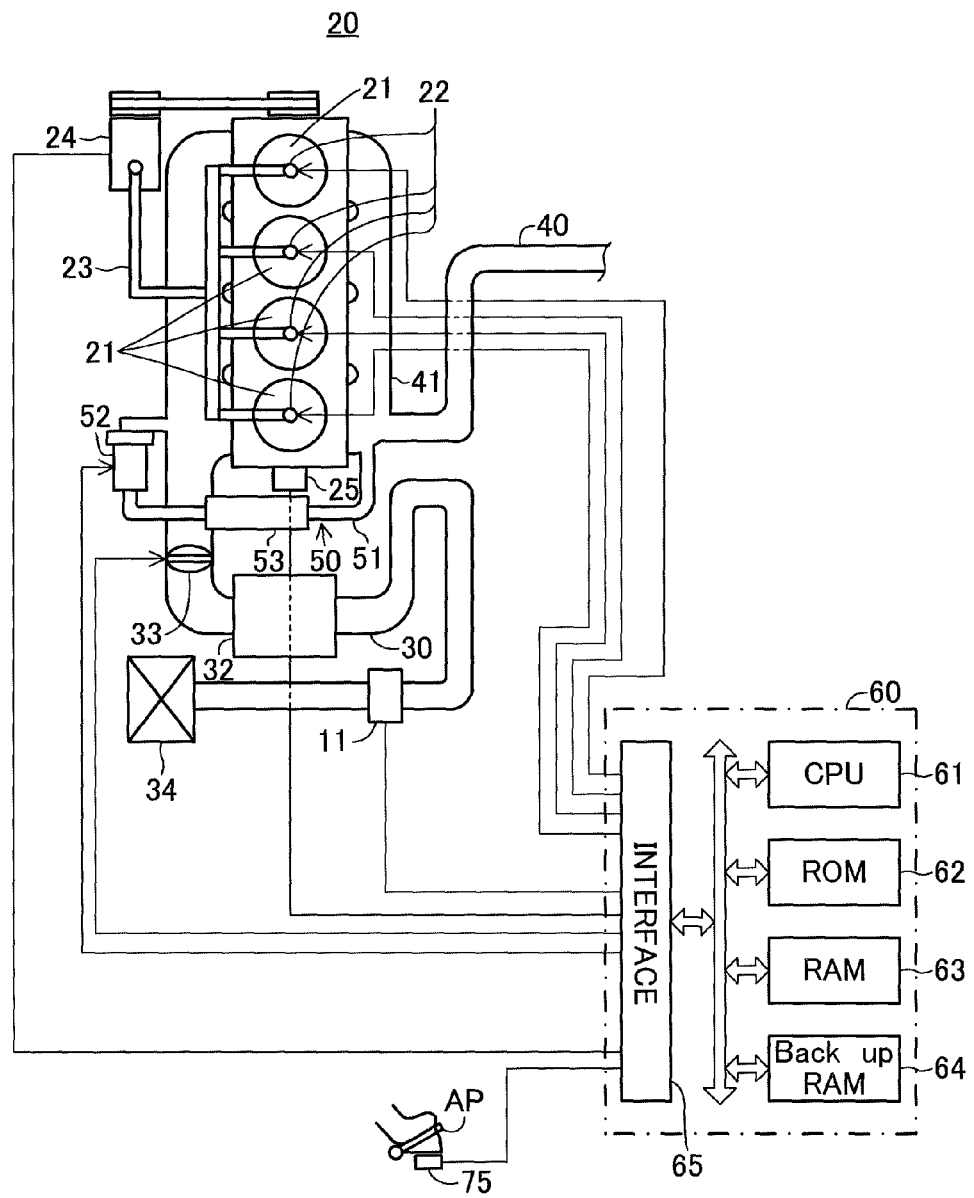
FIG. 3 is a view showing an internal combustion engine which the flow rate detection device of the embodiment of the invention is applied.

In FIG. 3, 22 denotes fuel injectors, 23 denotes a fuel passage for supplying a fuel to the injectors 22, 24 denotes a fuel pump for supplying the fuel to the injector 22, 25 denotes a crank position sensor for detecting a rotation phase of a crank shaft (not shown) of the engine, 32 denotes an inter cooler for cooling the air flowing through the intake passage 30, 33 denotes a throttle valve for controlling an amount of the air suctioned into the combustion chamber 21, 34 denotes an air cleaner, 40 denotes an exhaust passage, AP denotes an accelerator pedal, 75 denotes an accelerator depression amount sensor for detecting a depression amount of the accelerator pedal AP and 50 denotes an exhaust gas recirculation device.

The exhaust gas recirculation device (hereinafter, this device will be referred to as—EGR device—) 50 has a passage 51 extending from the exhaust passage 40 to the intake passage 30 (hereinafter, this passage will be referred to as—EGR passage—). A control valve 52 for controlling a flow rate of the exhaust gas flowing through the EGR passage 51 is positioned in the EGR passage 51. A cooler 53 for cooling the exhaust gas flowing through the EGR passage 51 is positioned in the EGR passage 51.

The unit 60 has a microprocessor (CPU) 61, a read only memory (ROM) 62, a random access memory (RAM) 63, a back-up memory (back-up RAM) 64 and an interface 65. The fuel injector 22, the fuel pump 24, the throttle valve 33 and the EGR control valve 52 are connected to the interface 65 and control signals for controlling the operation thereof are given to the unit 60 via the interface 65. The air flow meter 11, the crank position sensor 25 and the accelerator depression amount sensor 75 are connected to the interface 65 and the signals corresponding to the rotation phase of the crank shaft detected by the crank position sensor 25 and the depression amount of the accelerator pedal AP detected by the accelerator depression amount sensor 75 are input into the interface 65.

In the following description, the "upstream" and "downstream" mean the upstream and downstream sides, respectively in terms of the flow direction of the air flowing through the intake passage 30 toward the combustion chamber 21. Further, in the following description, the "AFM passing air" means the air passing through the air flow meter, the "AFM passing air flow rate" means the flow rate of the air passing through the air flow meter and the "during the engine operation" means during the operation of the engine 20.

The air flow meter 11 is a so-called silicon chip type air flow meter. This meter 11 has two temperature detection elements 12U and 12D and a heating resistor element 13. Each element 12U, 12D outputs an electric voltage corresponding to the surrounding temperature thereof. The flow rate detection device can calculate (i.e. realize) the surrounding temperature of each element 12U, 12D on the basis of the voltage output from each element 12U, 12D. In other words, each element 12U, 12D is an element for detecting the surrounding temperature thereof. An electric voltage is applied to the element 13. When the voltage is applied to the element 13, the element 13 generates the heat. The elements 12U, 12D and 13 are positioned in order in the particular direction. The element 12U remote from the element 13 is positioned at a position remote from the element 13 so that the temperature of the element 13 during the heat generation does not influence the element 12U. On the other hand, the element 12D near the element is positioned at a position near the element 13 so that the temperature of the element 13 during the heat generation influences the element 12D. The elements 12U, 12D and 13 are interposed between two insulation protection films 14U and 14L. The elements 12U, 12D and 13 interposed between the films 14U and 14L are positioned on a silicon substrate 15. In other words, the film 14L is formed on the substrate 15, the elements 12U, 12D and 13 are positioned on the film 14L and the film 14U is formed so that it covers the elements 12U, 12D and 13.

Figure 2:
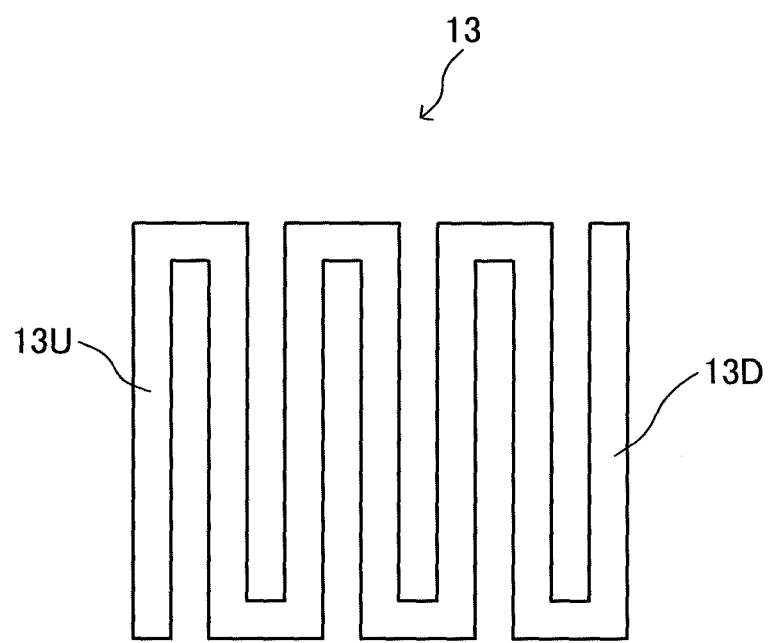
FIG. 2 is a view showing a heating resistor element of the air flow meter of the embodiment of the invention in detail.

As shown in FIG. 2, the heating resistor element 13 is constituted by a multi-fold continuous portion so that a plurality of portions extending in the direction perpendicular to the arrangement direction of the elements 12U, 12D and 13 (i.e. the above-mentioned particular direction) are formed. The element 13 has a length so that the heat does not reach immediately from the one end of the element 13 to the other end thereof.

The heating resistor element 13 and the temperature detection element 12U remote therefrom are connected to each other by a bridge circuit. Thereby, the voltage is applied to the element 13 so that the temperature of the element is higher than that surrounding the element 12U remote from the element 13 (i.e. the temperature realized on the basis of the voltage output from the element 12U remote from the element 13) by a constant temperature.

In the case where the flow rate detection device is applied to the engine of FIG. 3, the air flow meter 11 is positioned in the intake passage 30 so that the AFM passing air passes through the temperature detection element 12U remote from the heating resistor element 13, the temperature detection element 12D near the element 13 and the element 13 in order. As explained above, the element 12U remote from the element 13 (hereinafter, this element will be referred to as—upstream temperature detection element—) is positioned at a position remote from the element 13 so that the temperature of the element 13 during the heat generation does not influence the element 12U. Thus, the upstream element 12U outputs the electric voltage corresponding to the air reaching it. Therefore, the flow rate detection device can calculate (i.e. realize) the temperature of the air reaching the upstream element 12U on the basis of the voltage output from the upstream element 12U. On the other hand, as explained above, the temperature detection element 12D near the element 13 (hereinafter, this element will be referred to as—downstream temperature detection element—) is positioned at a position near the element 13 so that the temperature of the element 13 during the heat generation influences it. Thus, the downstream element 12D outputs the electric voltage corresponding to the temperature of the element 13. Therefore, the flow rate detection device can calculate (i.e. realize) the temperature of the element 13 on the basis of the voltage output from the downstream element 12D.

As explained above, the elements 12U and 13 are connected to each other by the bridge circuit. Thereby, the electric voltage is applied to the element 13 so that the temperature of the element 13 is higher than that surrounding the upstream element 12U (i.e. the temperature realized on the basis of the voltage output from the upstream element 12U) by a constant temperature. Therefore, in the case where the air flow meter 11 is positioned in the intake passage 30, the voltage is applied to the element 13 so that the temperature of the element 13 becomes a temperature (hereinafter, this temperature will be referred to as—base temperature—) higher than that of the air reaching the upstream element 12U by the constant temperature.

Next, the movement of the temperature of the heating resistor element 13 when the air flow meter 11 is positioned in the intake passage 30 of the engine 20 of FIG. 3 will be explained.

When the air flow meter 11 is positioned in the intake passage 30 and the air passes through the meter 11 from the inlet 31 toward the combustion chamber 21 (i.e. the air passes through the meter 11 in the forward direction), the heat is lost from the heating resistor element 13 by the AFM passing air. The amount of the heat lost by the AFM passing air from the upstream portion of the element 13 (i.e. the portion 13U of the element 13 located upstream along the air flow when the air passes through the air flow meter 11 in the forward direction) is larger than that lost by the AFM passing air from the downstream portion of the element (i.e. the portion 13D of the element 13 located downstream along the air flow when the air passes through the meter 11 in the forward direction). That is, when the AFM passing air passes through the element 13 in the forward direction, the AFM passing air reaching the downstream portion 13D of the heating resistor element is the air in which the temperature thereof increases due to the heat lost from the upstream portion 13U of the heating resistor element. Therefore, the temperature of the AFM passing air reaching the downstream portion 13D of the heating resistor element is higher than that of the AFM passing air reaching the upstream portion 13U of the heating resistor element. Thus, when the AFM passing air passes through the meter 11 in the forward direction, the amount of the heat lost from the upstream portion 13U of the element by the AFM passing air is larger than that of the heat lost from the downstream portion 13D of the element by the AFM passing air. Therefore, when the AFM passing air passes through the meter 11 in the forward direction, the temperature of the upstream portion 13U of the element is lower than that of the downstream portion 13D of the element. When the average temperature of the element 13 is lower than the base temperature, the voltage applied to the element 13 increases and when the average temperature of the element 13 is higher than the base temperature, the voltage applied to the element decreases. Therefore, according to this control of the voltage applied to the element 13, when the air passes through the meter 11 in the forward direction, the temperature of the upstream portion 13U of the element is lower than the base temperature and the temperature of the downstream portion 13D of the element is higher than the base temperature.

When the AFM passing air flow rate increases, the amount of the heat lost from the upstream portion 13U of the element by the AFM passing air increases. Therefore, the difference of the temperature of the upstream portion 13U of the element relative to the base temperature (hereinafter, this difference will be referred to as—element temperature difference—) increases when the flow rate of the AFM passing air passing the meter 11 in the forward direction increases.

On the other hand, when the air passes through the meter 11 in the direction opposite to the forward direction (hereinafter, this direction will be referred to as—backward direction—), the heat is lost from the heating resistor element 13 by the AFM passing air. In this regard, the amount of the heat lost from the upstream portion 13U of the element by the AFM passing air is smaller than that lost from the downstream portion 13D of the element by the AFM passing air. That is, when the AFM passing air passes through the element 13 in the backward direction, the AFM passing air reaching the upstream portion 13U of the element is the air in which the temperature thereof increases due to the heat lost from the downstream portion 13D of the element. Therefore, the temperature of the AFM passing air reaching the upstream portion 13U of the element is higher than that of the AFM passing air reaching downstream portion 13D of the element. Thus, when the AFM passing air passes through the meter 11 in the backward direction, the amount of the heat lost from the upstream portion of the element by the AFM passing air is smaller than that of the heat lost from the downstream portion 13D of the element by the AFM passing air. Therefore, when the AFM passing air passes the meter 11 in the backward direction, the temperature of the upstream portion 13U of the element is higher than that of the downstream portion 13D of the element. When the average temperature of the element 13 is lower than the base temperature, the voltage applied to the element 13 increases and when the average temperature of the element 13 becomes higher than the base temperature, the voltage applied to the element 13 decreases. Therefore, according to the control of the voltage applied to the element 13, when the air passes through the meter 11 in the backward direction, the temperature of the upstream portion 13U of the element is higher than the base temperature and the temperature of the downstream portion 13D of the element is lower than the base temperature.

When the AFM passing air flow rate increases, the amount of the heat lost from the downstream portion 13D of the element by the AFM passing air increases. Then, the voltage applied to the element 13 increases, depending on the increase of the amount of the heat lost from the downstream portion 13D of the element by the AFM passing air. Then, the temperature of the upstream portion 13U of the element increases, depending on the increase of the voltage applied to the element 13. Therefore, the difference of the temperature of the upstream portion 13U of the element relative to the base temperature (i.e. the element temperature difference) increases when the flow rate of the AFM passing air passing through the meter 11 in the backward direction increases.

Next, the calculation of the AFM passing air flow rate when the air passes through the meter 11 in the forward direction will be explained.

As explained above, the downstream element 12D is positioned upstream of and near the element 13. Thus, the downstream element 12D outputs the voltage corresponding to the temperature of the upstream portion 13U of the element. As explained above, the element temperature difference increases when the flow rate of the AFM passing air passing through the meter 11 in the forward direction increases. Therefore, the AFM passing air flow rate can be calculated (i.e. detected) on the basis of the difference between the base temperature and the temperature realized on the basis of the voltage output from the downstream element 12D when the air passes through the meter 11 in the forward direction (i.e. the element temperature difference).

Figure 4:
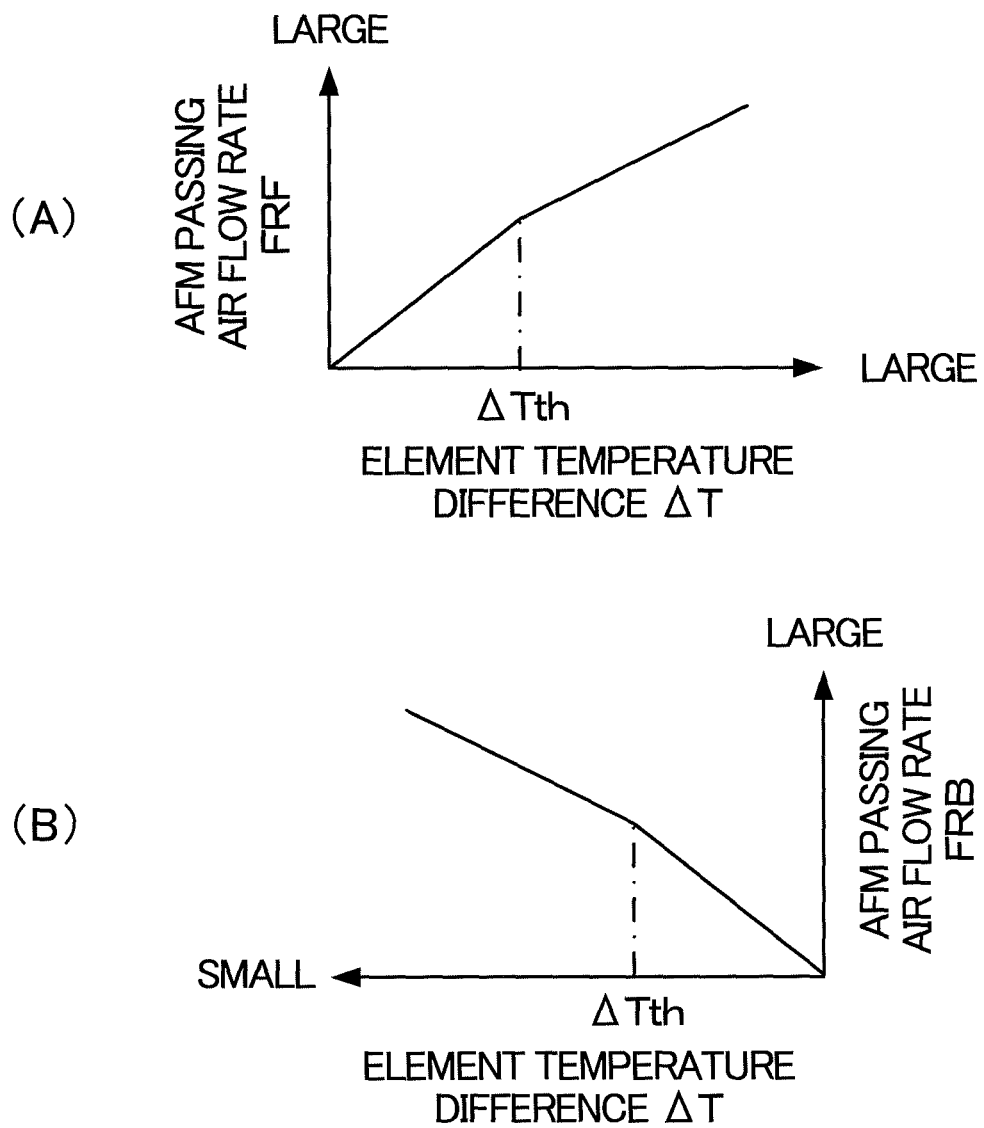
FIG. 4 (A) is a view showing a map used for acquiring a forward direction AFM passing air flow rate on the basis of an element temperature difference and (B) is a view showing a map used for acquiring a backward direction AFM passing air flow rate on the basis of the element temperature difference.

In this embodiment, the AFM passing air flow rates corresponding to the element temperature differences when the air passes through the meter 11 in the forward direction are obtained previously by an experiment, etc., and as shown in FIG. 4(A), these obtained AFM passing air flow rates are memorized as forward direction AFM passing air flow rates FRF in the unit 60 in the form of a map as a function of the element temperature difference $\Delta T$. When it is judged that the air passes through the meter 11 in the forward direction during the engine operation, the AFM passing air flow rate FRF is acquired (i.e. the AFM passing air flow rate is calculated) from the map of FIG. 4(A) on the basis of the element temperature difference $\Delta T$.

When the air passes through the meter 11 in the forward direction, the temperature of the upstream portion 13U of the element is lower than the base temperature and therefore, the element temperature difference is positive. Therefore, it can be realized that the air passes through the meter 11 in the forward direction from the fact that the element temperature difference is positive. In this embodiment, when the element temperature difference $\Delta T$ is positive, the AFM passing air flow rate is calculated from the map of FIG. 4(A).

The AFM passing air flow rate FRF calculated from the map of FIG. 4(A) is large as the element temperature difference $\Delta T$ is large. In the map of FIG. 4(A), the change rate of the AFM passing air flow rate relative to the element temperature difference $\Delta T$ when the element temperature difference $\Delta T$ is larger than a certain value $\Delta T th$ is smaller than that when the element temperature difference $\Delta T$ is smaller than the certain value $\Delta T th$.

Next, the calculation of the AFM passing air flow rate when the air passes through the meter 11 in the backward direction will be explained.

As explained above, the downstream element 12D is positioned upstream of and near the element 13. Thus, the downstream element 12D outputs the voltage corresponding to the temperature of the upstream portion 13U of the element. Further, as explained above, the element temperature difference increases when the flow rate of the AFM passing air passing through the meter 11 in the backward direction increases. Therefore, the AFM passing air flow rate can be calculated (i.e. detected) on the basis of the difference between the base temperature and the temperature realized on the basis of the voltage output from the downstream element 12D when the air passes through the meter 11 in the backward direction. In this regard, the large AFM passing air flow rate is calculated when the element temperature difference is large.

In this embodiment, the AFM passing air flow rates corresponding to the element temperature differences when the air passes through the meter 11 in the backward direction are obtained by an experiment, etc., and as shown in FIG. 4(B), these obtained AFM passing air flow rates are memorized as backward direction AFM passing air flow rate FRB in the unit 60 in the form of the map as a function of the element temperature difference $\Delta T$. When it is judged that the air passes through the meter 11 in the backward direction during the engine operation, the AFM passing air flow rate FRB is acquired (i.e. the AFM passing air flow rate is calculated) from the map of FIG. 4(B) on the basis of the element temperature difference $\Delta T$.

When the air passes through the meter 11 in the backward direction, the temperature of the upstream portion 13U of the element is higher than the base temperature and therefore, the element temperature difference is negative. Therefore, it can be realized that the air passes through the meter 11 in the backward direction from the fact that the element temperature difference is negative. In this embodiment, when the element temperature difference $\Delta T$ is negative, the AFM passing air flow rate is calculated from the map of FIG. 4(B).

The AFM passing air flow rate FRB calculated from the map of FIG. 4(B) is large as the element temperature difference $\Delta T$ is small (i.e. the absolute value of the element temperature difference $\Delta T$ is large). In the map of FIG. 4(B), the change rate of the AFM passing air flow rate FRB relative to the element temperature difference $\Delta T$ when the difference $\Delta T$ is larger than a certain value $\Delta T th$ is smaller than that when the difference $\Delta T$ is larger than the certain value $\Delta T th$.

When the flow rate of the air passing through the meter 11 (i.e. the flow rate of the air flowing through the intake passage 30) is relatively small, the air passes through the meter 11 under the laminar condition. On the other hand, when the flow rate of the air passing through the meter 11 is relatively large, the air passes through the meter 11 under the turbulent condition. The movement of the temperature of the element 13 when the air passes through the meter 11 under the laminar condition and the movement of the temperature of the element 13 when the air passes through the meter 11 under the turbulent condition are different from each other.

Next, the movements of the temperatures of the element 13 when the air passes through the meter 11 under the laminar and turbulent conditions, respectively will be explained. In the following description, as the temperature of the upstream portion 13U of the element is low, the voltage output from the downstream element 12D is large. Further, in the following description, the "AFM output value" is a value of the electric voltage output from the downstream element 12D and is a value proportional to the value of the voltage output from the downstream element 12D.

The amount of the heat lost from the element 13 by the AFM passing air in the case where the air passing through the meter 11 in the forward direction is under the laminar condition is smaller than that in the case where the air passing through the meter 11 in the forward direction is under the turbulent condition. Thus, independently of the fact that the air passing through the meter in the forward direction is under the laminar or turbulent condition, the temperature of the upstream portion 13U of the element is lower than the base temperature and the temperature of the upstream portion 13U of the element in the case where the air is under the turbulent condition is lower than that in the case where the air is under the laminar condition.

Similarly, the amount of the heat lost from the element 13 by the AFM passing air in the case where the air passing through the meter 11 in the backward direction is under the laminar condition is smaller than that in the case where the air passing through the meter 11 in the backward direction is under the turbulent condition. Thus, independently of the fact that the air passing through the meter 11 in the backward direction is under the laminar or turbulent condition, the temperature of the downstream portion 13D of the element is lower than the base temperature and the temperature of the downstream portion 13D of the element in the case where the air is under the turbulent condition is lower than that in the case where the air is under the laminar condition. As a result, independently of the fact that the air passing through the meter 11 in the backward direction is under the laminar or turbulent condition, the temperature of the upstream portion 13U of the element in the case where the air is under the turbulent condition is higher than that in the case where the air is under the laminar condition.

As explained above, the movements of the temperatures of the element 13 when the air passes through the meter 11 under the laminar and turbulent conditions, respectively are different from each other.

As explained above, when the air passes through the meter 11 in the forward direction, the temperature of the upstream portion 13U of the element in the case where the air is under the turbulent condition is lower than that in the case where the air is under the laminar condition. Thus, even when the temperature of the upstream portion 13u of the element is constant, the AFM passing air flow rate in the case where the AFM passing air is under the turbulent condition is smaller than that in the case where the AFM passing air is under the laminar condition. Further, when the air passes through the meter 11 in the backward direction, the temperature of the upstream portion 13U of the element in the case where the air is under the turbulent condition is higher than that in the case where the air is under the laminar condition. Thus, even when the temperature of the upstream portion 13U of the element is constant, the AFM passing air flow rate in the case where the AFM passing air is under the turbulent condition is smaller than that in the case where the AFM passing air is under the laminar condition.

Therefore, in order to calculate the accurate AFM passing air flow rate on the basis of the temperature of the upstream portion 13U of the element, the fact that the AFM passing air is under the laminar or turbulent condition should be considered.

In this embodiment, when the air passes the meter 11 in the forward direction, the AFM passing air flow rate is calculated from the map of FIG. 4(A) on the basis of the current element temperature difference $\Delta T$. The map of FIG. 4(A) is prepared on the basis of the relationship between the AFM passing air flow rate and the element temperature difference when changing the AFM passing air flow rate while making the air pass through the meter 11 in the forward direction, which relationship being obtained by an experiment, etc. That is, in the case where the AFM passing air is under the laminar condition when controlling the AFM passing air flow rate at a particular rate and making the air pass through the meter 11 in the forward direction in the experiment, etc., the relationship between the AFM passing air flow rate and the element temperature difference reflected by the fact that the AFM passing air is under the laminar condition is obtained and on the other hand, in the case that the AFM passing air is under the turbulent condition when controlling the AFM passing air flow rate at a particular rate and making the air pass through the meter 11 in the forward direction in the experiment, etc., the relationship between the AFM passing air flow rate and the element temperature difference reflected by the fact that the AFM passing air is under the turbulent condition is obtained. Thus, the map of FIG. 4(A) defines the relationship between the AFM passing air flow rate and the element temperature difference reflected by the fact that the AFM passing air is under the laminar or turbulent condition. Thus, in the map of FIG. 4(A), the change rate of the AFM passing air flow rate FRF relative to the element temperature difference $\Delta T$ when the difference $\Delta T$ is larger than the certain value $\Delta T th$ is smaller than that when the difference $\Delta T$ is smaller than the certain value $\Delta T th$. Therefore, the AFM passing air flow rate calculated from the map of FIG. 4(A) on the basis of the element temperature difference $\Delta T$ when the air passes through the meter 11 in the forward direction is reflected by the fact the AFM passing air is under the laminar or turbulent condition.

In the case where the air passes through the meter 11 in the forward direction, when the AFM passing air flow rate corresponds to the element temperature difference $\Delta T$ smaller than the value $\Delta T th$ of the FIG. 4(A), the air passes through the meter 11 under the laminar condition and on the other hand, when the AFM passing air flow rate corresponds to the element temperature difference $\Delta T$ equal to or larger than the value $\Delta T th$ of FIG. 4(A), the air passes through the meter 11 under the turbulent condition. That is, the AFM passing air flow rate corresponding to the value $\Delta T th$ of FIG. 4(A) is a boundary between the AFM passing air flow rates in the case that the AFM passing air is under the laminar and turbulent conditions. In the following description, the AFM passing air flow rate when the element temperature difference $\Delta T$ is equal to the value $\Delta T th$ of FIG. 4(A) will be referred to as —constant condition transition flow rate—.

In this embodiment, when the air passes through the meter 11 in the backward direction, the AFM passing air flow rate is calculated from the map of FIG. 4(B) on the basis of the current element temperature difference $\Delta T$. The map of FIG. 4(B) is prepared on the basis of the relationship between the AFM passing air flow rate and the element temperature difference when changing the AFM passing air flow rate while making the air pass through the meter 11 in the backward direction, which relationship being obtained by an experiment, etc. That is, in the case where the AFM passing air is under the laminar condition when controlling the AFM passing air flow rate at a particular rate and making the air pass through the meter 11 in the backward direction in the experiment, etc., the relationship between the AFM passing air flow rate and the element temperature difference reflected by the fact that the AFM passing air is under the laminar condition is obtained and on the other hand, in the case where the AFM passing air is under the turbulent condition when controlling the AFM passing air flow rate at a particular rate and making the air pass through the meter 11 in the backward direction in the experiment, etc., the relationship between the AFM passing air flow rate and the element temperature difference reflected by the fact that the AFM passing air is under the turbulent condition is obtained. Thus, the map of FIG. 4(B) defines the relationship between the AFM passing air flow rate and the element temperature difference reflected by the fact that the AFM passing air is under the laminar or turbulent condition. Thus, in the map of FIG. 4(B), the change rate of the AFM passing air flow rate FRB relative to the element temperature difference $\Delta T$ when the difference $\Delta T$ is smaller than a certain value $\Delta T th$ is smaller than that when the difference $\Delta T$ is larger than the certain value $\Delta T th$. Therefore, the AFM passing air flow rate calculated from the map of FIG. 4(B) on the basis of the difference $\Delta T$ when the air passes through the meter 11 in the backward direction is reflected by the fact that the AFM passing air is under the laminar or turbulent condition.

In the case that the air passes through the meter 11 in the backward direction, when the AFM passing air flow rate corresponds to the element temperature difference $\Delta T$ larger than the value $\Delta T th$ of FIG. 4(B), the air passes through the meter under the laminar condition and on the other hand, when the AFM passing air flow rate corresponds to the element temperature difference $\Delta T$ equal to or smaller than the value $\Delta T th$ of FIG. 4(B), the air passes through the meter 11 under the turbulent condition. That is, the AFM passing air flow rate corresponding to the value $\Delta T th$ of FIG. 4(B) is a boundary between the AFM passing air flow rates when the AFM passing air is under the laminar and turbulent conditions. In the following description, the AFM passing air flow rate when the element temperature difference ΔT is equal to the value ΔTth of FIG. 4(B) will be referred to as—constant condition transition flow rate.

Under the condition that the AFM passing air flow rate is constant or generally constant (i.e. when the change rate of the AFM passing air flow rate is zero or generally zero), as explained above, when the AFM passing air flow rate is smaller than the constant condition transition flow rate, the air passes through the meter 11 under the laminar condition and on the other hand, when the AFM passing air flow rate is equal to or larger than the constant condition transition flow rate, the air passes through the meter 11 under the turbulent condition. Therefore, when the AFM passing air flow rate is constant or generally constant, the AFM passing air flow rate corresponding to the actual AFM passing air flow rate is calculated from the map of FIG. 4(A) or FIG. 4(B) on the basis of the element temperature difference.

In this regard, in the case where the AFM passing air flow rate is calculated from the map of FIG. 4(A) or FIG. 4(B) on the basis of the element temperature difference as explained above while the AFM passing air flow rate has increased from a rate smaller than the constant condition transition flow rate to a rate larger than the constant condition transition flow rate, a part of the calculated AFM passing air flow rate may not correspond to the actual AFM passing air flow rate.

Particularly, in the case where the condition of the AFM passing air has changed from the laminar condition to the turbulent condition while the AFM passing air flow rate has increased from the rate smaller than the constant condition transition flow rate to the rate larger than the constant condition transition flow rate, the phenomena that the AFM passing air flow rate calculated from the map of FIG. 4(A) or FIG. 4(B) on the basis of the element temperature difference as explained above does not correspond to the actual AFM passing air flow rate may occur before the condition of the AFM passing air has changed from the laminar condition to the turbulent condition.

The reason why such a phenomena occurs may be the followings. In the case where the condition of the AFM passing air has changed from the laminar condition to the turbulent condition while the AFM passing air flow rate has increased from the flow rate smaller than the constant condition transition flow rate to the flow rate larger than the constant condition transition flow rate, the condition of the AFM passing air has changed from the laminar condition to the turbulent condition gradually, not instantaneously. In other words, in the case where the condition of the AFM passing air has changed from the laminar condition to the turbulent condition, a constant time is needed for the condition of the AFM passing air to change from the laminar condition to the turbulent condition completely. Therefore, in this case, before the condition of the AFM passing air has changed from the laminar condition to the turbulent condition completely, there are the laminar and turbulent conditions in the AFM passing air. Thus, in the case where the AFM passing air flow rate is calculated on the basis of the element temperature difference from the map of FIG. 4(A) or FIG. 4(B) prepared (or corrected), suppose that the condition of the AFM passing air is in one of the laminar and turbulent conditions before the condition of the AFM passing air has changed completely from the laminar condition to the turbulent condition, the calculated AFM passing air flow rate does not correspond to the actual AFM passing air flow rate. This is one of the reasons why the above-mentioned phenomena occur.

In the case where the condition of the AFM passing air has changed from the laminar condition to the turbulent condition while the AFM passing air flow rate has increased from the rate smaller than the constant condition transition flow rate to the rate larger than the constant condition transition flow rate, the condition of the AFM passing air may start to change from the laminar condition toward the turbulent condition after the AFM passing flow rate reaches the constant condition transition flow rate, not at the same time as the AFM passing flow rate reaches the constant condition transition flow rate. That is, before a constant time from when the AFM passing air flow rate reaches the constant condition transition flow rate has elapsed, the condition of the AFM passing air may be maintained at the laminar condition. Therefore, in this case, even if the condition of the AFM passing air has changed instantaneously from the laminar condition to the turbulent condition, at least in the case where the AFM passing air flow rate is calculated on the basis of the element temperature difference from the map of FIG. 4(A) or FIG. 4(B) prepared suppose that the AFM passing air is under the turbulent condition after the AFM passing air flow rate becomes larger than the constant condition transition flow rate before the condition of the AFM passing air starts to change from the laminar condition toward the turbulent condition after the AFM passing air flow rate reaches the constant condition transition flow rate, the calculated AFM passing air flow rate does not correspond to the actual passing air flow rate. This may be one of the reasons why the above-mentioned phenomena occur.

Of course, also in this case (i.e. the case where the condition of the AFM passing air starts to change from the laminar condition toward the turbulent condition after the AFM passing air flow rate reaches the constant condition transition flow rate), there is a high possibility that a constant time is needed in order that the condition of the AFM passing air has changed completely from the laminar condition to the turbulent condition. In this regard, in the case that the AFM passing air flow rate is calculated on the basis of the element temperature difference from the map of FIG. 4(A) or FIG. 4(B) prepared suppose that the AFM passing air is in either of the laminar and turbulent conditions before the condition of the AFM passing air has completely changed from the laminar condition to the turbulent condition, the calculated AFM passing air flow rate may correspond to the actual AFM passing air flow rate.

In the case where the condition of the AFM passing air has changed from the laminar condition to the turbulent condition before the AFM passing air flow rate has increased from the rate smaller than the constant condition transition flow rate to the rate larger than the constant condition transition flow rate, the condition of the AFM passing air may start to change from the laminar condition toward the turbulent condition before the AFM passing air flow rate reaches the constant condition transition flow rate, not at the same time as the AFM passing air flow rate reaches the constant condition transition flow rate. That is, before the AFM passing air flow rate reaches the constant condition transition flow rate, the AFM passing air may not be under the laminar condition. Therefore, in this case, independently of whether the condition of the AFM passing air has changed completely from the laminar condition to the turbulent condition instantaneously or for a constant time, at least, in the case where the AFM passing air flow rate is calculated on the element temperature difference from the map of FIG. 4(A) or FIG. 4(B) prepared suppose that the AFM passing air is under the laminar condition before the AFM passing air flow rate reaches the constant condition transition flow rate after the condition of the AFM passing air starts to change from the laminar condition toward the turbulent condition, the calculated AFM passing air flow rate does not correspond to the actual AFM passing air flow rate. This may be one of the reasons why the above-mentioned phenomena occur.

In this case (i.e. the case where the condition of the AFM passing air starts to change from the laminar condition toward the turbulent condition before the AFM passing air flow rate reaches the constant condition transition flow rate), a constant time is needed in order that the condition of the AFM passing air has changed from the laminar condition to the turbulent condition and therefore, the condition of the AFM passing air may have not changed completely from the laminar condition to the turbulent condition at the same time as the AFM passing air flow rate reaches the constant condition transition flow rate. In this regard, in the case where the AFM passing air flow rate is calculated on the basis of the element temperature difference from the map of FIG. 4(A) or FIG. 4(B) prepared suppose that the AFM passing air is under the turbulent condition after the AFM passing air flow rate becomes larger than the constant condition transition flow rate before the condition of the AFM passing air has changed completely from the laminar condition to the turbulent condition, the calculated AFM passing air flow rate does not correspond to the actual AFM passing air flow rate.

In the case where the condition of the AFM passing air has changed from the laminar condition to the turbulent condition while the AFM passing air flow rate has increased from the rate smaller than the constant condition transition flow rate to the rate larger than the constant condition transition flow rate, when the AFM passing air flow rate is calculated by the same method as the method for calculating the AFM passing air flow rate when the AFM passing air flow rate is constant or generally constant, the calculated AFM passing air flow rate may correspond to the actual AFM passing air flow rate due to the fact that a constant time is needed for the complete change of the condition of the AFM passing air from the laminar condition to the turbulent condition, or due to the face that the condition of the AFM passing air starts to change from the laminar condition toward the turbulent condition before the AFM passing air flow rate reaches the constant condition transient flow rate, or due to the fact that the condition of the AFM passing air starts to change from the laminar condition toward the turbulent condition after the AFM passing air flow rate reaches the constant condition transition flow rate.

In this regard, both cases where the calculated AFM passing air flow rate is larger and smaller than the actual AFM passing air flow rate may occur. It has been found by the study of the inventor of this application that the AFM passing air flow rate and its increase rate while the AFM passing air flow rate has increased from the rate smaller than the constant condition transition flow rate to the rate larger than the constant condition transition flow rate determine whether the calculated AFM passing air flow rate is larger or smaller than the actual AFM passing air flow rate.

In this embodiment, under the condition that the AFM passing air is made to pass through the air flow meter continuously in the forward direction, the AFM passing air flow rate is increased with various increase rates from the rate smaller than the constant condition transition flow rate to the rate larger than the constant condition transition flow rate so that the change of the condition of the AFM passing air from the laminar condition to the turbulent condition occurs and then, coefficients to be multiplied the element temperature difference ΔT for correcting the element temperature difference ΔT so that the AFM passing air flow rate calculated from the map of FIG. 4(A) corresponds to the actual AFM passing air flow rate are obtained previously from the relationship between the actual AFM passing air flow rate and the AFM passing air flow rate calculated from the map of FIG. 4(A) on the basis of the current element temperature difference ΔT by an experiment, etc. As shown in FIG. 5(A), these obtained coefficients are memorized as forward direction increase condition correction coefficient KFi in the unit 60 in the form of the map as a function of the AFM passing air flow rate and its increase rate ΔFRfi.

Figure 5:
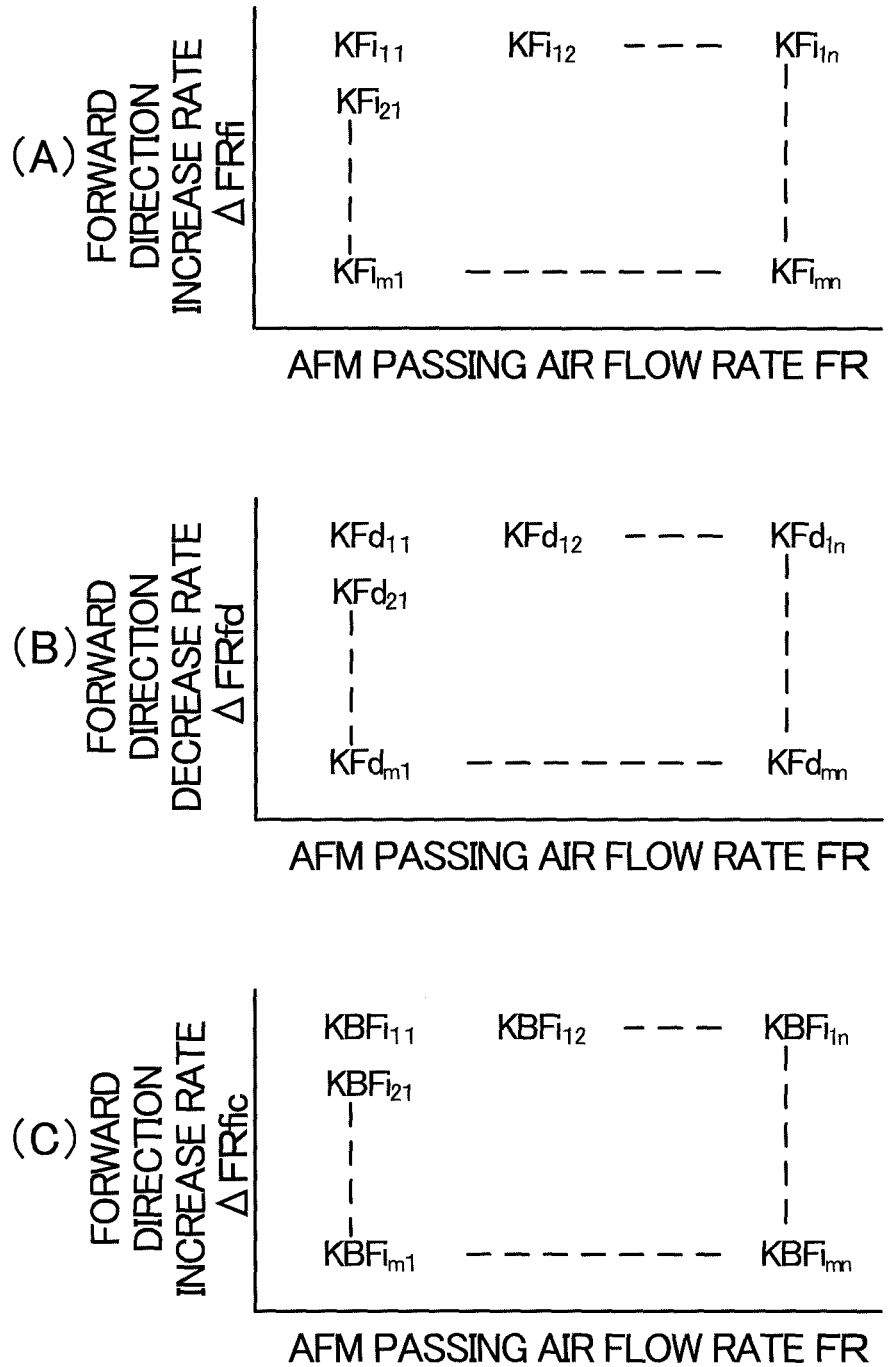
FIG. 5 (A) is a view showing a map used for acquiring a forward direction increase condition correction coefficient on the basis of the AFM passing air flow rate and its decrease rate, (B) is a view showing a map used for acquiring a forward direction decrease condition correction coefficient on the basis of the AFM passing air flow rate and its decrease rate and (C) is a view showing a map used for acquiring a backward-forward direction increase condition correction coefficient on the basis of the AFM passing air flow rate and its increase rate.

In the case where the AFM passing air flow rate is actually detected, when the AFM passing air passes through the air flow meter continuously in the forward direction and the AFM passing air flow rate increases, the forward direction increase condition correction coefficient KFi is acquired from the map of FIG. 5 on the basis of the AFM passing air flow rate and its increase rate ΔFRfi. Then, the element temperature difference ΔT is corrected by multiplying the same ΔT by this acquired correction coefficient KFi. Then, the AFM passing air flow rate is calculated from the map of FIG. 4(A) on the basis of this corrected element temperature difference ΔT.

According to this, even if the condition of the AFM passing air has changed from the laminar condition to the turbulent condition while the AFM passing air passes through the air flow meter continuously in the forward direction and the AFM passing air flow rate increase, the AFM passing air flow rate corresponding to the actual AFM passing air flow meter is calculated.

The forward direction increase condition correction coefficient KFi acquired from the map of FIG. 5(A) may be larger than 1 or smaller than 1 or equal to 1. In this regard, it can be estimated that the coefficient KFi is generally small as the AFM passing air flow rate is large and as the increase rate of the AFM passing air flow rate is large. Further, it can be estimated that the coefficient KFi is 1 until just before the AFM passing air flow rate reaches the constant condition transition flow rate, becomes smaller than 1 from just before the AFM passing air flow rate reaches the constant condition transition flow rate, is maintained at a value smaller than 1 until the AFM passing air flow rate becomes larger than the constant condition transition flow rate by a constant flow rate, and becomes 1 when the AFM passing air flow rate becomes larger than the constant condition transition flow rate by the constant flow rate. It can be estimated that the range of the AFM passing air flow rate for maintaining the coefficient KFi smaller than 1 after the AFM passing air flow rate becomes larger than the constant condition transition flow rate depends on the increase rate of the AFM passing air flow rate, particularly, the range is large as the increase rate of the AFM passing air flow rate.

Figure 6:
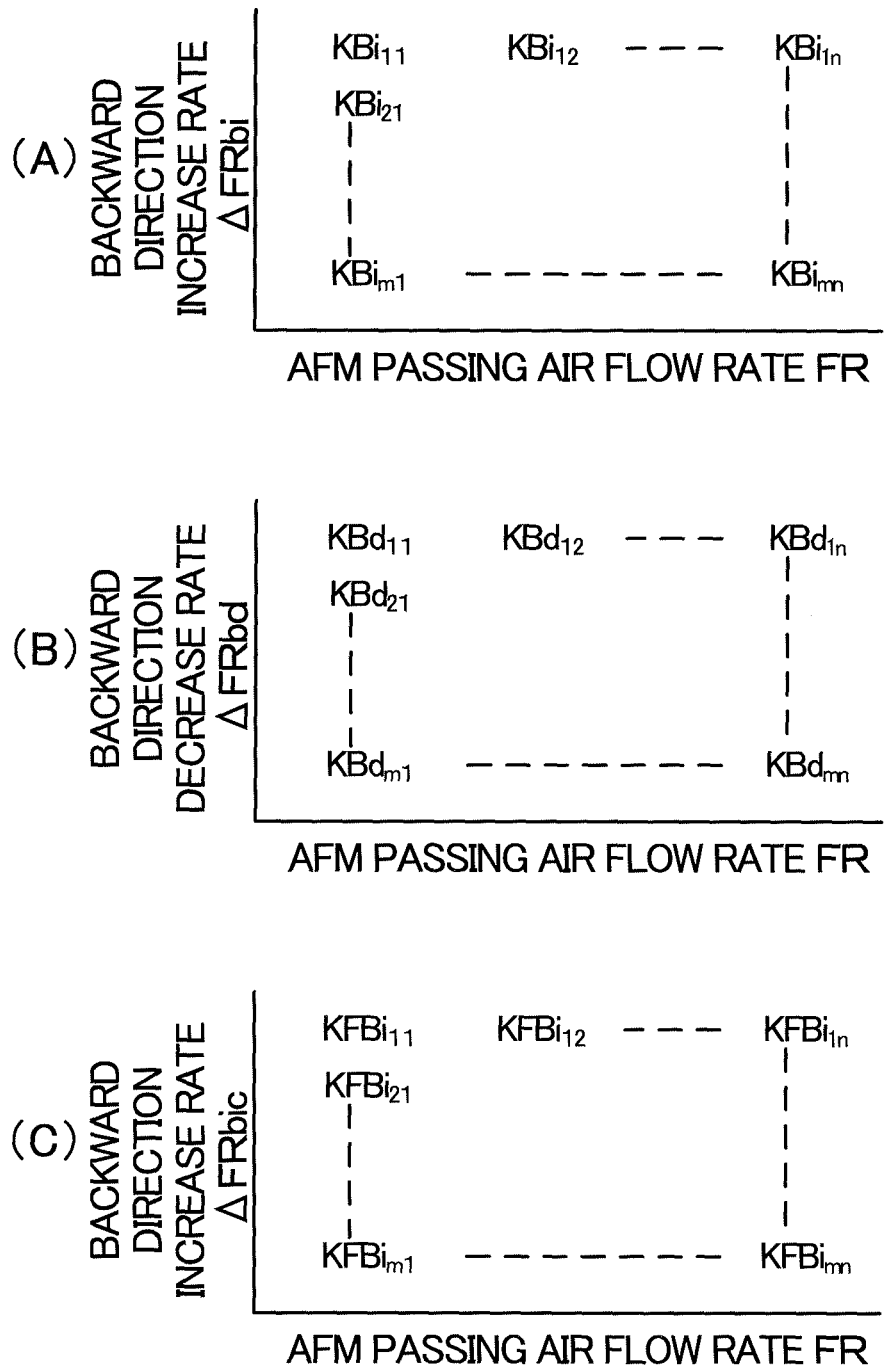
FIG. 6 (A) is a view showing a map used for acquiring a backward direction increase condition correction coefficient on the basis of the AFM passing air flow rate and its increase rate, (B) is a view showing a map used for acquiring a backward direction decrease condition correction coefficient on the basis of the AFM passing air flow rate and its decrease rate and (C) is a view showing a map used for acquiring the forward-backward direction increase condition correction coefficient on the basis of the AFM passing air flow rate and its increase rate.

Similarly, in this embodiment, while making the AFM passing air pass through the air flow meter continuously in the backward direction, the AFM passing air flow rate is made to be increased from the rate smaller than the constant condition transition flow rate to the rate larger than the constant condition transition flow rate with various increase rates so that the change of the condition of the AFM passing air from the laminar condition to the turbulent condition occurs and coefficients to be multiplied element temperature difference ΔT for correcting the difference ΔT so that the AFM passing air flow rate calculated from the map of FIG. 4(B) corresponds to the actual AFM passing air flow rate are previously obtained by an experiment, etc. from the relationship between the actual AFM passing air flow rate and the AFM passing air flow rate calculated from the map of FIG. 4(B) on the basis of the current element temperature difference ΔT. As shown in FIG. 6(A), these obtained coefficients are memorized as backward direction increase condition correction coefficient KBi in the unit 60 in the form of the map as a function of the AFM passing air flow rate FR and its increase rate ΔFRbi.

In the case where the AFM passing air flow rate is actually detected, when the AFM passing air passes through the air flow meter continuously in the backward direction and the AFM passing air flow rate increases, the backward direction increase condition correction coefficient KBi is acquired from the map of FIG. 6(A) on the basis of the AFM passing air flow rate FR and its increase rate ΔFRbi. Then, the element temperature difference ΔT is corrected by multiply the difference ΔT by this acquired coefficient KBi. Then, the AFM passing air flow rate is calculated from the map of FIG. 4(B) on the basis of this corrected difference ΔT.

According to this, even if the condition of the AFM passing air has changed from the laminar condition to the turbulent condition while the AFM passing air passes through the air flow meter continuously in the backward direction and the AFM passing air flow rate increases, the AFM passing air flow rate corresponding to the actual rate is calculated.

The coefficient KBi acquired from the map of FIG. 6(A) may be larger than 1 or smaller than 1 or equal to 1. In this regard, it can be estimated that the coefficient KBi is generally small as the AFM passing air flow rate is large and as the increase rate of the AFM passing air flow rate is large. Further, it can be estimated that coefficient KBi is generally maintained 1 until just before the AFM passing air flow rate reaches the constant condition transition flow rate, becomes smaller than 1 from just before the AFM passing air flow rate reaches the constant condition transition flow rate, is maintained smaller than 1 until the AFM passing air flow rate becomes larger than the constant condition transition flow rate by a constant flow rate and becomes 1 when the AFM passing air flow rate is larger than the constant condition transition flow rate by the constant flow rate. It can be estimated that the range of the AFM passing air flow rate for making the coefficient KBi smaller than 1 after the AFM passing air flow rate becomes larger than the constant condition transition flow rate depends on the increase rate of the AFM passing air flow rate, particularly, the range is large as the increase rate of the AFM passing are flow rate is large.

In the engine 20, it is known that when the air to be suctioned into the combustion chamber 21 flows through the intake passage 30, the so-called pulsation occurs in the air. As shown in FIG. 3, in the case where the exhaust gas discharged from the chamber 21 to the exhaust passage 40 is introduced into the passage 30 by the EGR device 50, the pulsation occurring in the air flowing through the passage 30 becomes large. In the case where the pulsation occurs in the air flowing through the passage 30, the flow direction of the air changes between the forward and backward directions.

When the flow direction of the AFM passing air changes from the forward direction to the backward direction, the condition of the AFM passing air has changed from the laminar condition in the forward direction to the turbulent condition in the backward direction via the condition that the AFM passing air flow rate is zero. When the flow direction of the AFM passing air has changed from the forward direction to the backward direction, the flow direction of the AFM passing air reverses and a unique flow rate such as the AFM passing air flow rate having zero occurs instantaneously. Thus, the AFM passing air flow rate increases just after the flow direction of the AFM passing air has changed from the forward direction to the backward direction and therefore, in the case where the AFM passing air flow rate is calculated from the map of FIG. 4(B) on the basis of the element temperature difference ΔT, the calculated AFM passing air flow rate does not correspond to the actual flow rate and even when the AFM passing air flow rate is calculated from the map of FIG. 4(B) on the basis of the difference ΔT corrected by multiplying the same by the coefficient KBi acquired from the map of FIG. (A), there is a possibility that the calculated flow rate does not correspond to the actual flow rate.

In this embodiment, the flow direction of the AFM passing air is made to change from the forward direction to the backward direction so that the AFM passing air flow rate increases with various increase rates just after the flow direction has changed from the forward direction to the backward direction and coefficients to be multiplied the element temperature difference ΔT for correction the difference ΔT so that the AFM passing air flow rate calculated from the map of FIG. 4(B) corresponds to the actual flow rate are previously obtained by an experiment, etc. from the relationship between the actual AFM passing air flow rate and the AFM passing air flow rate calculated from the map of FIG. 4(B) on the basis of the current element temperature difference ΔT. As shown in FIG. 6(C), these obtained coefficients are memorized as forward-backward direction increase condition correction coefficient KFBi in the unit 60 in the form of the map as a function of the AFM passing air flow rate FR and its increase rate (this increase rate is that of the AFM passing air flow rate just after the flow direction of the AFM passing air has changed from the forward direction to the backward direction) ΔFRbic.

In the case where the AFM passing air flow rate is actually detected, when the flow direction of the AFM passing air has changed from the forward direction to the backward direction, the coefficient KFBi is acquired from the map of FIG. 6(C) on the basis of the flow rate FR and its increase rate ΔFRbic. Then, the difference ΔT is corrected by multiplying the difference ΔT by this acquired coefficient KFBi. Then, the AFM passing air flow rate is calculated from the map of FIG. 4(B) on the basis of this corrected difference ΔT.

According to this, even when the flow direction of the AFM passing air has changed from the forward direction to the backward direction, the AFM passing air flow rate corresponding to the actual flow rate is calculated.

Similarly, when the flow direction of the AFM passing air changes from the backward direction toward the forward direction, the condition of the AFM passing air has changed from the laminar condition in the backward direction to the laminar condition in the forward direction via the condition that the AFM passing air flow rate is zero. When the flow direction of the AFM passing air has changed from the backward direction to the forward direction, the flow direction of the AFM passing air reverses and the unique flow rate such as the AFM passing air flow rate having zero occurs instantaneously. Thus, the AFM passing air flow rate increases just after the flow direction of the AFM passing air has changed from the backward direction to the forward direction and therefore, in the case where the AFM passing air flow rate is calculated from the map of FIG. 4(A) on the basis of the difference ΔT, the calculated flow rate does not correspond to the actual flow rate and even when the AFM passing air flow rate is calculated from the map of FIG. 4(A) on the basis of the difference ΔT corrected by multiplying it by the coefficient KFi acquired from the map of FIG. 5(A), there is a possibility that the calculated flow rate does not correspond to the actual flow rate.

In this embodiment, the flow direction of the AFM passing air is made to change from the backward direction to the forward direction so that the AFM passing air flow rate increases with various increase rates just after the flow direction of the AFM passing air has changed from the backward direction to the forward direction and then, coefficients to be multiplied the difference ΔT for correcting the difference ΔT so that the flow rate calculated from the map of FIG. 4(A) corresponds to the actual flow rate are previously obtained by an experiment, etc. from the relationship between the actual AFM passing air flow rate and the AFM passing air flow rate calculated from the map of FIG. 4(A) on the basis of the current difference $\Delta T$. As shown in FIG. 5(C), these obtained coefficients are memorized as backward-forward direction increase condition correction coefficient KBFi in the unit 60 in the form of the map as a function of the AFM passing air flow rate FR and its increase rate (this increase rate is that of the AFM passing air flow rate just after the flow direction of the AFM passing air has changed from the backward direction to the forward direction) $\Delta FR$fic.

In the case where the AFM passing air flow rate is actually detected, when the flow direction of the AFM passing air has changed from the backward direction to the forward direction, the coefficient KBFi is acquired from the map of FIG. 5(C) on the basis of the AFM passing air flow rate and its increase rate $\Delta FR$fic. Then, the difference $\Delta T$ is corrected by multiplying the difference $\Delta T$ by this acquired coefficient KBFi. Then, the flow rate is calculated from the map of FIG. 4(A) on the basis of this corrected difference $\Delta T$.

According to this, even when the flow direction of the AFM passing air has changed from the backward direction to the forward direction, the AFM passing air flow rate corresponding to the actual flow rate is calculated.

In the case where the AFM passing air flow rate is calculated from the map of FIG. 4(A) or FIG. 4(B) on the basis of the element temperature difference as explained above while the AFM passing air flow rate has decreased from the rate larger than the constant condition transition flow rate to the rate smaller than the constant condition transition flow rate, the calculated flow rate may not partially correspond to the actual flow rate.

Particularly, in the case where the condition of the AFM passing air has changed from the turbulent condition to the laminar condition while the AFM passing air flow rate has decreased from the rate larger than the constant condition transition flow rate to the rate smaller than the constant condition transition flow rate, a phenomena that the flow rate calculated from the map of FIG. 4(A) or FIG. 4(B) on the basis of the element temperature difference as explained above while the condition of the AFM passing air has changed from the turbulent condition to the forward condition does not correspond to the actual flow rate may occur.

These phenomena may occur due to the following reason. That is, in the case where the condition of the AFM passing air changes from the turbulent condition to the laminar condition while the AFM passing air flow rate has decreased from the rate larger than the constant condition transition flow rate to the rate smaller than the constant condition transition flow rate, the condition of the AFM passing air has changed completely from the turbulent condition to the laminar condition gradually, not instantaneously. In other words, in the case where the condition of the AFM passing air changes from the turbulent condition to the laminar condition, a constant time is needed until the condition of the AFM passing air has changed completely from the turbulent condition to the laminar condition. Therefore, in this case, before the condition of the AFM passing air has changed completely from the turbulent condition to the laminar condition, the AFM passing air is in both of the turbulent and laminar conditions. Thus, in the case where the AFM passing air flow rate is calculated on the basis of the element temperature difference from the map of FIG. 4(A) and FIG. 4(B) prepared suppose that the AFM passing air is in either of the turbulent and laminar conditions, the calculated flow rate does not correspond to the actual flow rate. This is one of the reasons why the above-mentioned phenomena occur.

Further, in the case where the condition of the AFM passing air has changed from the turbulent condition to the laminar condition while the AFM passing air flow rate has decreased from the rate larger than the constant condition transition flow rate to the rate smaller than the constant condition transition flow rate, the condition of the AFM passing air may start to change from the turbulent condition toward the laminar condition after the AFM passing air flow rate has reached the constant condition transition flow rate, not at the same time as the AFM passing air flow rate has reached the constant condition transition flow rate. That is, while a constant time has elapsed from when the AFM passing air flow rate has reached the constant condition transition flow rate, the condition of the AFM passing air may be maintained at the turbulent condition. Therefore, in this case, if the condition of the AFM passing air has changed instantaneously from the turbulent condition to the laminar condition, at least, in the case where the AFM passing air flow rate is calculated on the basis of the element temperature difference from the map of FIG. 4(A) or FIG. 4(B) prepared suppose that the AFM passing air is under the laminar condition after the AFM passing air flow rate becomes smaller than the constant condition transition flow rate from when the AFM passing air flow rate has reached the constant condition transition flow rate to when the condition of the AFM passing air starts to change from the turbulent condition to the laminar condition, the calculated flow rate does not correspond to the actual flow rate. This is also one of the reasons why the above-mentioned phenomena occur.

Of course, in this case (i.e. the case where the condition of the AFM passing air starts to change from the turbulent condition to the laminar condition after the AFM passing air flow rate has reached the constant condition transition flow rate), there is a high possibility that a constant time is needed until the condition of the AFM passing air has changed completely from the turbulent condition to the laminar condition. In this regard, in the case where the AFM passing air flow rate is calculated on the basis of the element temperature difference from the map of FIG. 4(A) or FIG. 4(B) prepared suppose that the AFM passing air is in either of the turbulent and laminar conditions before the condition of the AFM passing air has changed completely from the turbulent condition to the laminar condition, the calculated flow rate does not correspond to the actual flow rate.

In the case where the condition of the AFM passing air has changed from the turbulent condition to the laminar condition while the AFM passing air flow rate has decreased from the rate larger than the constant condition transition flow rate to the rate smaller than the constant condition transition flow rate, the condition of the AFM passing air may start to change from the turbulent condition toward the laminar condition before the AFM passing air flow rate has reached the constant condition transition flow rate, not at the same time as the AFM passing air flow rate has reached the constant condition transition flow rate. That is, the condition of the AFM passing air may not be maintained at the turbulent condition until the AFM passing air flow rate has reached the constant condition transition flow rate. In this regard, independently of whether the condition of the AFM passing air has changed completely from the turbulent condition to the laminar condition instantaneously or for a constant time, at least, in the case where the AFM passing air flow rate is calculated on the basis of the element temperature difference from the map of FIG. 4(A) or FIG. 4(B) prepared suppose that the AFM passing air is under the turbulent condition from when the condition of the AFM passing air starts to change from the turbulent condition to the laminar condition to when the AFM passing air flow rate has reached the constant condition transition flow rate, the calculated flow rate does not correspond to the actual flow rate. This is also one of the reasons why the above-mentioned phenomena occur.

In this case (i.e. the case where the condition of the AFM passing air starts to change from the turbulent condition toward the laminar condition before the AFM passing air flow rate has reached the constant condition transition flow rate), the condition of the AFM passing air has changed from the turbulent condition to the laminar condition for a constant time and therefore, there is a possibility that the condition of the AFM passing air has not changed from the turbulent condition to the laminar condition when the AFM passing air flow rate has reached the constant condition transition flow rate. In this regard, in the case where the AFM passing air flow rate is calculated on the element temperature difference from the map of FIG. 4(A) or FIG. 4(B) prepared suppose that the AFM passing air is under the laminar after the AFM passing air flow rate became smaller than the constant condition transition flow rate during the period from when the AFM passing air flow rate has reached the constant condition transition flow rate to when the condition of the AFM passing air has changed completely from the turbulent condition to the laminar condition, the calculated flow rate does not correspond to the actual flow rate.

In the case where the condition of the AFM passing air has changed from the turbulent condition to the laminar condition while the AFM passing air flow rate has decreased from the rate larger than the constant condition transition flow rate to the rate smaller than the constant condition transition flow rate, when the AFM passing air flow rate is calculated by the same method as the method for calculating the AFM passing air flow rate when the AFM passing air flow rate is constant or generally constant, the calculated flow rate may not correspond to the actual flow rate due to the fact that a constant time is needed for the condition of the AFM passing air to change from the turbulent condition to the laminar condition or due to the face that the condition of the AFM passing air starts to change from the turbulent condition to the laminar condition before the AFM passing air flow rate has reached the constant condition transition flow rate or due to the fact that the condition of the AFM passing air starts to change from the turbulent condition to the laminar condition after the AFM passing air flow rate has reached the constant condition transition flow rate.

In this regard, the calculated flow rate may be larger or smaller than the actual flow rate. It is found by the study of the inventor of this application that the AFM passing air flow rate and its decrease rate while the AFM passing air flow rate has decreased from the rate larger than the constant condition transition flow rate to the rate smaller than the constant condition transition flow rate determine whether the calculated flow rate is larger or smaller than the actual flow rate.

In this embodiment, while the AFM passing air passes through the air flow meter continuously in the forward direction, the AFM passing air flow rate is made to decrease from the rate larger than the constant condition transition flow rate to the rate smaller than the constant condition transition flow rate with various decrease rates so that the change of the condition of the AFM passing air from the turbulent condition to the laminar condition occurs and then, coefficients to be multiplied the difference ΔT for correcting the difference ΔT so that the AFM passing air flow rate calculated from the map of FIG. 4(A) corresponds to the actual flow rate from the relationship between the actual AFM passing air flow rate and the AFM passing air flow rate calculated from the map of FIG. 4(A) on the basis of the current difference ΔT. As shown in FIG. 5(B), these obtained coefficients are memorized as forward direction decrease condition correction coefficient KFd in the unit 60 in the form of the map as a function of the AFM passing air flow rate FR and its decrease rate ΔFRfd.

In the case where the AFM passing air flow rate is actually detected, when the AFM passing air passes through the air flow meter continuously in the forward direction and the AFM passing air flow rate decreases, the coefficient KFd is acquired from the map of FIG. 5(B) on the basis of the AFM passing air flow rate FR and its decrease rate ΔFRfd. Then, the difference ΔT is corrected by multiplying the difference ΔT by this acquired coefficient KFd. Then, the AFM passing air flow rate is calculated from the map of FIG. 4(A) on the basis of this corrected difference ΔT.

According to this, even if the condition of the AFM passing air has changed from the turbulent condition to the laminar condition while the AFM passing air passes through the air flow meter continuously in the forward direction and the AFM passing air flow rate decreases, the AFM passing air flow rate corresponding to the actual flow rate is calculated.

The coefficient KFd acquired from the map of FIG. 5(B) may be larger than 1 or smaller than 1 or equal to 1. In this regard, it can be estimated that the coefficient KFd is generally small as the AFM passing air flow rate is large and the coefficient KFd is generally large as the decrease rate of the AFM passing air flow rate is small (i.e. as the absolute value of the decrease rate of the AFM passing air flow rate). Further, it can be estimated that the coefficient KFd is generally 1 just before the AFM passing air flow rate has reached the constant condition transition flow rate, becomes larger than 1 from just before the AFM passing air flow rate has reached the constant condition transition flow rate, is maintained larger than 1 until the AFM passing air flow rate becomes smaller than the constant condition transition flow rate by a constant flow rate and becomes 1 when the AFM passing air flow rate becomes smaller than the constant condition transition flow rate by a flow rate more than the constant flow rate. It can be estimated that the range of the AFM passing air flow rate for making the coefficient KFd larger than 1 after the AFM passing air flow rate became smaller than the constant condition transition flow rate depends on the decrease rate of the AFM passing air flow rate, particularly, this range is large as the decrease rate of the AFM passing air flow rate is large.

Similarly, in this embodiment, while the AFM passing air is made to pass through the air flow meter continuously in the backward direction, the AFM passing air flow rate is decreased with various decrease rate from the rate larger than the constant condition transition flow rate to the rate smaller than the constant condition transition flow rate so that the change of the condition of the AFM passing air from the turbulent condition to the laminar condition occurs and then, coefficients to be multiplied the difference ΔT for correcting the difference ΔT so that the flow rate calculated from the map of FIG. 4(B) corresponds to the actual flow rate are previously obtained by an experiment, etc. from the relationship between the actual AFM passing air flow rate and the AFM passing air flow rate calculated from the map of FIG. 4(B) on the basis of the current difference ΔT. As shown in FIG. 6(B), these obtained coefficients are memorized as the backward direction decrease condition correction coefficient KBd in the unit 60 in the form of the map as a function of the AFM passing air flow rate FR and its decrease rate ΔFRbd.

In the case where the AFM passing air flow rate is actually detected, when the AFM passing air passes through the air flow meter continuously in the backward direction and the AFM passing air flow rate decreases, the coefficient KBd is acquired from the map of FIG. 6(B) on the basis of the flow rate FR and its decrease rate ΔFRbd. Then, the difference ΔT is corrected by multiplying the difference ΔT by this acquired coefficient KBd. Then, the flow rate is calculated from the map of FIG. 4(B) on the basis of this corrected difference ΔT.

According to this, even if the condition of the AFM passing air has changed from the turbulent condition to the laminar condition while the AFM passing air passes through the air flow meter continuously in the backward direction and the AFM passing air flow rate decreases, the AFM passing air flow rate corresponding to the actual flow rate is calculated.

The coefficient KBd acquired from the map of FIG. 6(B) may be larger than 1 or smaller than 1 or equal to 1. In this regard, the coefficient KBd is generally small as the AFM passing air flow rate is large and the coefficient KBd is generally large as the decrease rate of the AFM passing air flow rate is small (i.e. as the absolute value of the decrease rate of the AFM passing air flow rate is large). Further, in general, it can be estimated that the coefficient KBd is 1 until just before the AFM passing air flow rate has reached the constant condition transition flow rate, the coefficient KBd becomes larger than 1 from just before the AFM passing air flow rate has reached the constant condition transition flow rate, the coefficient KBd is larger than 1 until the AFM passing air flow rate has become smaller than the constant condition transition flow rate by a constant flow rate and the coefficient KBd becomes 1 when the AFM passing air flow rate is smaller than the constant condition transition flow rate by more than the constant flow rate. Further, it can be estimated that the range of the AFM passing air flow rate for making the coefficient KBd larger than 1 after the AFM passing air flow rate has become smaller than the constant condition transition flow rate depends on the decrease rate of the AFM passing air flow rate, particularly, the range is large as the decrease rate of the AFM passing air flow rate is large.

According to the above-explained embodiment, the following technical effect can be obtained. As explained above, the air flows under the laminar or turbulent condition, depending on its flow rate. The output property of the downstream element 12D when the condition of the AFM passing air flowing a particular direction (i.e. the forward or backward direction) has changed from the laminar condition to the turbulent condition (and the output property of the downstream element 12D until a constant time has elapsed from when the condition of the AFM passing air has changed from the laminar condition to the turbulent condition) is different from that when the AFM passing air flowing in the same direction as the above-mentioned particular direction is constantly under the turbulent condition. Further, the output property of the downstream element 12D when the condition of the AFM passing air flowing in a particular direction (i.e. the forward or backward direction) has changed from the turbulent condition to the laminar condition (and the output property of the downstream element 12D until a constant time has elapsed from when the condition of the AFM passing air has changed from the turbulent condition to the laminar condition) is also different from that when the AFM passing air flowing in the same direction as the above-mentioned particular direction is constantly under the laminar condition.

Therefore, in order to make the flow rate detection device detect the AFM passing air flow rate accurately when the condition of the AFM passing air has changed from the laminar condition to the turbulent condition (or from when the condition of the AFM passing air has changed from the laminar condition to the turbulent condition to when a constant time has elapsed), when the condition of the AFM passing air has changed from the laminar condition to the turbulent condition (or until a constant time has elapsed after the condition has changed), it is preferred to detect the AFM passing air flow rate, handling the AFM output value in a manner different from that of the handling of the AFM output value when the AFM passing air is constantly under the turbulent condition. Further, in order to make the flow rate detection device detect the AFM passing air flow rate accurately when the condition of the AFM passing air has changed from the turbulent condition to the laminar condition (or until a constant time has elapsed after the condition of the AFM passing air has changed from the turbulent condition to the laminar condition), when the condition of the AFM passing air has changed from the turbulent condition to the laminar condition (or until a constant time has elapsed after the condition has changed), it is preferred to detect the AFM passing air flow rate, handling the AFM output value in a manner different from that of the handling of the AFM output value when the AFM passing air is constantly under the laminar condition.

Which change of the condition of the AFM passing air from the laminar condition to the turbulent condition or vice versa occurs depends on the AFM passing air flow rate and its change rate.

In the above-explained embodiment, the correction coefficient (i.e. the increase or decrease condition correction coefficient Ki or Kd) is appropriately acquired on the basis of the AFM passing air flow rate and its change rate (i.e. the increase or decrease rate of the AFM passing air flow rate), the AFM output value is corrected by this acquired correction coefficient and then, the AFM passing air flow rate is calculated on the basis of this corrected AFM output value. In the above-explained embodiment, the AFM output value may not be corrected depending on the combination of the AFM passing air flow rate and its change rate. Therefore, in the above-explained embodiment, it is judged if the AFM output value should be corrected on the basis of the AFM passing air flow rate and its change rate and in this regard, when it is judged that the AFM output value should be corrected, the AFM output value is corrected and then, the AFM passing air flow rate is calculated on the basis of this corrected AFM output value.

Therefore, according to the above-explained embodiment, a technical effect can be obtained that even when the condition of the AFM passing air has changed from the laminar condition to the turbulent condition and vice versa, the AFM passing air flow rate can be accurately calculated by the flow rate detection device.

Further, as explained above, when the pulsation occurs in the AFM passing air and therefore, the flow direction of the AFM passing air changes from the forward direction to the backward direction, the condition of the AFM passing air changes from the turbulent condition in the forward direction to the laminar condition in the forward direction, then, changes therefrom to the condition that the AFM passing air flow rate becomes zero, then, changes therefrom to the laminar condition in the backward direction, then, changes therefrom to the turbulent condition in the backward direction. That is, the AFM passing air has five different conditions. Further, every the condition of the AFM passing air changes from one of the above-mentioned conditions to the other one of the above-mentioned conditions, the corresponding relationship between the element temperature difference and the AFM passing air flow rate is different from that when the same condition is constantly maintained. Thus, if the AFM passing air flow rates are calculated from the corresponding relationship between the element temperature difference and the AFM passing air flow rate suppose that the condition of the AFM passing air is constant (i.e. in the constant condition) while the flow direction of the AFM passing air changes from the forward direction to the backward direction, in particular, there is a possibility that the total of the calculated AFM passing air flow rates is substantially different from the total of the actual AFM passing air flow rates. In this regard, according to the above-explained embodiment, the element temperature difference is appropriately corrected depending on the condition of the AFM passing air and then, the AFM passing air flow rate is calculated on the basis of this corrected difference and therefore, the AFM passing air flow rate corresponding to the actual flow rate is constantly calculated. Thus, it can be restricted that the total of the calculated AFM passing air flow rates differs from the total of the actual low rates substantially.

Similarly, when the pulsation occurs in the AFM passing air and therefore, the flow direction of the AFM passing direction changes from the backward direction to the forward direction, the condition of the AFM passing air changes from the turbulent condition in the backward direction to the laminar condition in the forward direction, then, changes therefrom to the condition that the AFM passing air flow rate becomes zero, then, changes therefrom to the laminar condition in the forward direction and then, changes therefrom to the turbulent condition in the forward direction. That is, the AFM passing air has five different conditions. In this case, every the condition of the AFM passing air changes from one of the above-mentioned conditions to the other one of the conditions, the corresponding relationship between the element temperature difference and the AFM passing air flow rate is different from that when the condition is constant. Thus, if the AFM passing air flow rates are calculated from the corresponding relationship between the element temperature difference and the AFM passing air flow rate suppose that the condition of the AFM passing air is constant (i.e. the constant condition) while the flow direction of the AFM passing air changes from the backward direction to the forward direction, in particular, there is a possibility that the total of the calculated AFM passing air flow rates differs from that of the actual flow rate substantially. In this regard, according to the above-explained embodiment, the element temperature difference is appropriately corrected depending on the condition of the AFM passing air and then, the AFM passing air flow rate is calculated on the basis of this corrected difference and therefore, the AFM passing air flow rate corresponding to the actual flow rate is constantly calculated. Thus, it can be restricted that the total of the calculated AFM passing air flow rates differs from that of the actual flow rates substantially.

In consideration of the above description, broadly, the flow rate detection device of the above-explained embodiment has the air flow meter for outputting the AFM output value depending on the AFM passing air flow rate and detects the AFM passing air flow rate by calculating the AFM passing air flow rate on the basis of the AFM output value, wherein it is judged if the AFM output value should be corrected on the basis of the AFM passing air flow rate and its change rate and then, when it is judged that the AFM output value should be corrected, the AFM output value is corrected and then, the AFM passing air flow rate is calculated on the basis of this corrected AFM output value.

The judgment of the above-explained embodiment that the AFM output value should be corrected means that when considering the AFM passing air flow rate and its change rate, it is found that the change of the condition of the AFM passing air from the laminar condition to the turbulent condition or vice versa or the change of the flow direction of the AFM passing air from the forward direction to the backward direction or vice versa occurred (or such a change of the condition or the flow direction of the AFM passing air may have occurred or will occur and as a result, it is found that the element temperature difference should be handled in a manner different from that of the handling of the AFM output value when the AFM passing air is constantly under the turbulent or laminar condition or the flow direction of the AFM passing air is constantly the forward or backward direction (i.e. the element temperature difference should be corrected).

As explained above, the output property of the downstream element 12D when the condition of the AFM passing air has changed from the laminar condition to the turbulent condition is different from that when the AFM passing air is constantly under the turbulent condition and the output property of the downstream element 12D when the condition of the AFM passing air changes from the turbulent condition to the laminar condition is different from that when the AFM passing air is constantly under the laminar condition. Therefore, in order to detect the AFM passing air flow rate accurately by the flow rate detection device, preferably, it is surely realized that the condition of the AFM passing air has changed from the laminar condition to the turbulent condition or vice versa, then, the element temperature difference is corrected and then, the AFM passing air flow rate is calculated on the basis of this corrected difference.

Similarly, the output property of the downstream element 12D when the flow direction of the AFM passing air changes from the forward direction to the backward direction is different from that when the flow direction of the AFM passing air is constantly the backward direction and the output property of the downstream element 12D when the flow direction of the AFM passing air changes from the backward direction to the forward direction is different from that when the flow direction of the AFM passing air is constantly in the forward direction. In order to detect the AFM passing air flow rate accurately by the flow rate detection device, preferably, it is surely realized that the flow direction of the AFM passing air has changed from the forward direction to the backward direction or vice versa, then, the element temperature is corrected and then, the AFM passing air flow rate is calculated on the basis of this corrected difference.

In this regard, in the above-explained embodiment, the correction coefficient (i.e. the forward direction increase or decrease condition correction coefficient KFi or KFd or the backward-forward direction increase condition correction coefficient KBFi or the backward direction increase or decrease condition correction coefficient KBi or KBd or the forward-backward direction increase condition correction coefficient KFBi) is appropriately acquired on the basis of the AFM passing air flow rate and its change rate (i.e. the increase or decrease rate of the AFM passing air flow rate when the flow direction of the AFM passing air is the forward or backward direction), then, the element temperature difference is corrected by this acquired correction coefficient and then, the AFM passing air flow rate is calculated on the basis of this corrected difference. The judgment of the above-explained embodiment that the element temperature difference should be corrected corresponds to the judgment that the condition of the AFM passing air has changed from the laminar condition to the turbulent condition or vice versa or the flow direction of the AFM passing air has changed from the forward direction to the backward direction or vice versa.

Therefore, in consideration of the above description, broadly, the flow rate detection device of the above-explained embodiment has the air flow meter for outputting the AFM output value depending on the AFM passing air flow rate and detects the AFM passing air flow rate by calculating the AFM passing air flow rate on the basis of the AFM output value, wherein it is judged if the condition of the AFM passing air has changed from the laminar condition to the turbulent condition or vice versa or the flow direction of the AFM passing air has inverted on the basis of the AFM passing air flow rate and its change rate, then, when it is judged that the condition of the AFM passing air has changed from the laminar condition to the turbulent condition or vice versa or the flow direction of the AFM passing air has inverted, the AFM output value is corrected and then, the AFM passing air flow rate is calculated on the basis of this corrected AFM output value.

In the above-explained embodiment, the correction coefficient (i.e. the increase or decrease condition correction coefficient Ki or Kd) is acquired on the basis of the AFM passing air flow rate and its change rate (i.e. the increase or decrease rate of the AFM passing air flow rate), then, the AFM output value is corrected by this acquired correction coefficient and then, the AFM passing air flow rate is calculated on the basis of this corrected AFM output value. In this regard, the point defined by the AFM passing air flow rate and its increase rate corresponding to the increase condition correction coefficient other than 1 corresponds to the point defined by the AFM passing air flow rate and its increase rate when the condition of the AFM passing air changes from the laminar condition to the turbulent condition and the point defined by the AFM passing air flow rate and its decrease rate corresponding to the decrease condition correction coefficient other than 1 corresponds to the point defined by the AFM passing air flow rate and its increase rate when the condition of the AFM passing air changes from the turbulent condition to the laminar condition.

Therefore, when referring to the point defined by the AFM passing air flow rate and its increase rate corresponding to the increase condition correction coefficient other than 1 as—flow rate increase condition transition point—, in the above-explained embodiment, the flow rate increase condition transition point is previously obtained, then, it is judged if the point defined by the AFM passing air flow rate and its increase rate is the flow rate increase condition transition point when the AFM passing air flow rate increases, wherein when it is judged that the point defined by the AFM passing air flow rate and its increase rate is the flow rate increase condition transition point, it is judged that the condition of the AFM passing air has changed from the laminar condition to the turbulent condition, then, the AFM output value is corrected by the increase condition correction coefficient Ki other than 1 and then, the AFM passing air flow rate is calculated on the basis of this corrected AFM output value.

Further, when referring to the point defined by the AFM passing air flow rate and its decrease rate corresponding to the decrease condition correction coefficient other than 1 as—flow rate decrease condition transition point—, in the above-explained embodiment, the flow rate decrease condition transition point is previously obtained and it is judged if the point defined by the AFM passing air flow rate and its decrease rate is the flow rate decrease condition transition point when the AFM passing air flow rate decreases, wherein when it is judged that the point defined by the AFM passing air flow rate and its decrease rate is the flow rate decrease condition transition point, it is judged that the condition of the AFM passing air has changed from the turbulent condition to the laminar condition, then, the AFM output value is corrected by the decrease condition correction coefficient Kd other than 1 and then, the AFM passing air flow rate is calculated on the basis of this corrected AFM output value.

Further, in the above-explained embodiment, the relationship between the element temperature difference calculated on the basis of the AFM output value when the change rate of the AFM passing air flow rate is zero or generally zero and the current temperature difference is defined in the maps of FIGS. 4(A) and (B). Then, when the change rate of the AF passing air flow rate is zero or generally zero, the AFM passing air flow rate is calculated from the map of FIG. 4(A) or (B) on the basis of the element temperature difference and on the other hand, when the change rate of the AFM passing air flow rate is not zero or generally zero, the element temperature difference is corrected by the correction coefficient and then, the AFM passing air flow rate is calculated from the map of FIG. 4(A) or (B) on the basis of this corrected difference.

Therefore, in the above-explained embodiment, the relationship between the element temperature difference and AFM passing air flow rate when the change rate of the AFM passing air flow rate is zero or generally zero is previously obtained and the AFM passing air flow rate is calculated from the relationship on the basis of the element temperature difference or the corrected difference.

Further, in the above-explained embodiment, the forward and backward direction increase condition correction coefficients KFi and KBi, and the backward-forward an forward-backward direction increase condition correction coefficients KBFi and KFBi differ, respectively, depending on the AFM passing air flow rate and its increase rate and the forward and backward direction decrease correction coefficients KFd and KBd differ, respectively, depending on the AFM passing air flow rate and its decrease rate.

Therefore, in the above-explained embodiment, the degree of the correction to the element temperature difference when the difference is corrected by the correction coefficient is determined depending on the AFM passing air flow rate and its change rate (i.e. the increase or decrease rate).

Further, in the above-explained embodiment, when the AFM passing air flow rate increases or decreases or the flow direction of the AFM passing air inverts, the element temperature difference is corrected by the correction coefficient. However, in the case where the relationship between the actual AFM passing air flow rate and the output value obtained depending on the AFM passing air flow rate when the change rate of the AFM passing air flow rate is zero or generally zero is previously realized and the actual AFM passing air flow rate is calculated from the relationship on the basis of the output value obtained depending on the AFM passing air flow rate, the output value may be corrected by the correction coefficient when the AFM passing air flow rate increases or decreases or the flow direction of the AFM passing air inverts and then, the actual AFM passing air flow rate may be calculated from the relationship on the basis of this corrected output value.

In consideration of the above matter, broadly, so as to be able to calculate the AFM passing air flow rate corresponding to the actual AFM passing air flow rate when the AFM passing air flow rate increases or decreases or the flow direction of the AFM passing air flow rate inverts using the relationship between the particular parameter (i.e. in the above-explained embodiment, the element temperature difference) and the AFM passing air flow rate when the change rate of the AFM passing air flow rate is zero or generally zero, the above-explained embodiment corrects the above-mentioned particular parameter or another parameter used to obtain the above-mentioned particular parameter and then, calculate the AFM passing air flow rate from the above-mentioned relationship on the basis of this corrected parameter.

In the above-explained embodiment, the correction coefficients KFi, KBi, KBFi and KFBi used to correct the element temperature difference during the increase of the AFM passing air flow rate are set on the basis of the AFM passing air flow rate and its increase rate. As explained above, this is based on the knowledge that in the case where the condition of the AFM passing air changes from the laminar condition to the turbulent condition while the AFM passing air flow rate increases from the flow rate smaller than the constant condition transition flow rate to the flow rate larger than the constant condition transition flow, due to the fact that a constant time is needed until the condition of the AFM passing air completely changes from the laminar condition to the turbulent condition or the fact that the condition of the AFM passing air starts to change from the laminar condition toward the turbulent condition before or after the AFM passing air flow rate reaches the constant condition transition flow rate or in the case where the flow direction of the AFM passing air inverts, due to the fact that the AFM passing air immediately after the inverting is in the unique condition, if the AFM passing air flow rate is calculated by the same method as the calculation method of the AFM passing air flow rate when the AFM passing air flow rate is constant or generally constant, a phenomena that the calculated flow rate does not correspond to the actual flow rate may occur.

In this regard, the atmospheric pressure may influence the occurrence of such phenomena. In the above-explained embodiment, the correction coefficients KFi, KBi, KBFi and KFBi may be set on the basis of the AFM passing air flow rate, its increase rate and the atmospheric pressure. Further, the temperature of the AFM passing air may influence the above-mentioned phenomena. In the embodiment, the correction coefficients KFi, KBi, KBFi and KFBi may be set on the basis of the AFM passing air flow rate, its increase rate and the temperature of the AFM passing air. Of course, in the above-explained embodiment, the correction coefficients KFi, KBi, KBFi and KFBi may be set on the basis of the AFM passing air flow rate, its increase rate, the atmospheric pressure and the temperature of the AFM passing air.

In the case where the atmospheric pressure is used as one parameter for setting of the correction coefficients KFi, KBi, KBFi and KFBi, it is believed that generally, the correction coefficient is set as a small value as the atmospheric pressure is high. Further, in the case where the temperature of the AFM passing air is used as one parameter for the setting of the correction coefficient KFi, KBi, KBFi and KFBi, it is believed that generally, the correction coefficient is set as a small value as the temperature of the AFM passing air is high.

On the other hand, in the above-explained embodiment, the correction coefficients KFd and KBd used to correct the AFM output value during the decrease of the AFM passing air flow rate are set on the basis of the AFM passing air flow rate and its decrease rate. This is based on the knowledge that as explained above, in the case where the condition of the AFM passing air changes from the turbulent condition to the laminar condition until the AFM passing air flow rate decreases from the flow rate larger than the constant condition transition flow rate to the flow rate smaller than the constant condition transition flow rate, due to the fact that it is needed until the condition of the AFM passing air completely changes from the turbulent condition to the laminar condition or the fact that the condition of the AFM passing air starts to change from the turbulent condition toward the laminar condition before or after the AFM passing air flow rate reaches the constant condition transition flow rate, if the AFM passing air flow rate is calculated by the same method as the calculation method of the AFM passing air flow rate when the AFM passing air flow rate is constant or generally constant, a phenomena that the calculated flow rate does not correspond to the actual flow rate may occur.

In this regard, it is believed that the atmospheric pressure may influence the occurrence of such phenomena. In the above-explained embodiment, the correction coefficient KFd and KBd may be set on the basis of the AFM passing air flow rate, its decrease rate and the atmospheric pressure. Further, it is believed that the temperature of the AFM passing air may influence the occurrence of the above-mentioned phenomena. In the above-explained embodiment, the correction coefficients KFd and KBd may be set on the basis of the AFM passing air flow rate, its decrease rate and the temperature of the AFM passing air. Of course, in the above-explained embodiment, the correction coefficients KFd and KBd may be set on the basis of the AFM passing air flow rate, its decrease rate, the atmospheric pressure and the temperature of the AFM passing air.

It is believed that in the case where the atmospheric pressure is used as one parameter for the setting of the correction coefficients KFd and KBd, generally, the correction coefficient is set as a large value as the atmospheric pressure is high. Further, it is believed that in the case where the temperature of the AFM passing air is used as one parameter for the setting of the correction coefficients KFd and KBd, generally, the correction coefficient is set as a large value as the temperature of the AFM passing air is high.

Further, in the case where the AFM output value has a first order lag relative to the change of the temperature of the upstream portion 13U of the heating resistor element, it is preferred that the AFM output value is corrected such that the first order lag of the AFM output value is eliminated before the element temperature difference is corrected by multiplying the difference by the above-mentioned correction coefficient and thereafter, the element temperature difference is corrected by multiplying the element temperature difference calculated on the basis of the corrected AFM output value by the above-mentioned correction coefficient.

Therefore, in the case where the element temperature difference should be corrected by the correction coefficient other than 1 when the AFM passing air flow rate increases or decreases, the first order lag of the AFM output value is eliminated before the element temperature difference is corrected, the element temperature difference is calculated on the basis of the AFM output value in which its first order lag is eliminated, this calculated difference is corrected by the correction coefficient and the AFM passing air flow rate is calculated on the basis of this corrected difference.

Further, the flow rate detection device of the above-explained embodiment detects the air flow rate. In this regard, the concept regarding this flow rate detection device can be applied to the device for detecting the flow rate of the gas other than the air. Therefore, broadly, it can be said that this invention can be applied to the device for detecting the gas flow rate.

Further, the flow rate detection device of the above-explained embodiment has the silicon chip type air flow meter. In this regard, the concept regarding the flow rate detection device of the above-explained embodiment can be applied to the flow rate detection device having the air flow meter other than the silicon chip type air flow meter (e.g. hot wire type air flow meter, Karman vortex type air flow meter, etc.). Further, the flow rate detection device of the above-explained embodiment has the silicon chip type air flow meter with the above-explained arrangements. In this regard, the concept regarding the flow rate detection device of the above-explained embodiment can be applied to the flow rate detection device having the silicon chip type air flow meter with arrangements other than the above-explained arrangements. Therefore, broadly, it can be said that this invention can be applied to the flow rate detection device having the air flow meter for detecting the flow rate of the gas flowing under the turbulent condition as well as the laminar condition and flowing in the backward direction as well as the forward direction and having the different output value properties when the gas condition does not change and when the gas condition changes between the laminar and turbulent conditions or the gas flow direction inverts, respectively.

In the above-explained embodiment, the different correction coefficients are prepared as those for correcting the element temperature difference, depending on whether the flow condition of the AFM passing air is one just after it has changed from the backward condition to the forward condition or vice versa and the AFM passing air flow rate increases largely or whether the flow condition of the AFM passing air is continuously in the forward or backward condition and the AFM passing air flow rate largely increases or decreases. In this regard, in order to simplify the calculation of the AFM passing air flow rate, the same correction coefficient may be employed as some of the above-mentioned correction coefficients.

Next, an example of a routine for performing the calculation of the AFM passing flow rate according to the above-mentioned embodiment will be explained. This routine is shown in FIGS. 7 to 10. This routine is performed every a predetermined time has elapsed.

When the routine of FIGS. 7 to 10 starts, at step 100, the current output value Vu of the upstream temperature detection element 12U, current AFM output value (i.e. the current output value of the downstream temperature detection element 12D) Vd and the AFM passing air flow rates $FR(k-1)$ and $FR(k-2)$ calculated by the last time performance and the performance just therebefore of this routine are acquired. Next, at step 101, the change rate of the AFM passing air flow rate until the last time performance of this routine from the performance just therebefore of this routine is calculated as an this time change rate $\Delta FR(k)$ of the AFM passing air flow rate on the basis of the flow rates $FR(k-1)$ and $FR(k-2)$ acquired at step 100. Next, at step 102, it is judged if the flow direction of the AFM passing air at this time performance of this routine is the forward direction. When it is judged that the flow direction of the AFM passing air is the forward direction, the routine proceeds to step 103 of FIG. 8. On the other hand, when it is judged that the flow direction of the AFM passing air is not the forward direction (i.e. is the backward direction), the routine proceeds to step 119 of FIG. 10. At step 102, it is judged that the flow direction of the AFM passing air is the forward direction when the last time AFM passing air flow rate $FR(k-1)$ acquired at step 100 is positive and on the other hand, it is judged that the flow direction of the AFM passing air is not the forward direction when the AFM passing air flow rate $FR(k-1)$ is negative.

Figure 8:
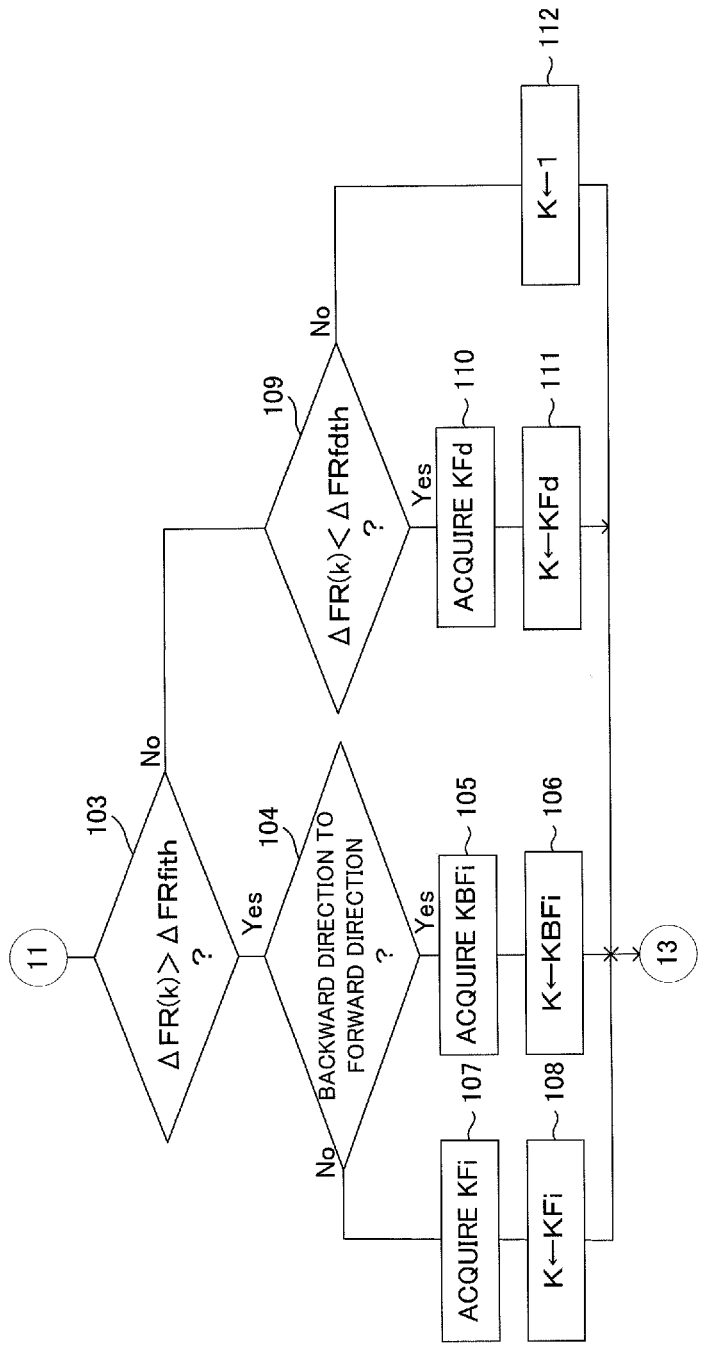
FIG. 8 is a view showing a portion of the example of the routine for performing the calculation of the AFM passing air flow rate according to the embodiment of the invention.

When it is judged that the flow direction of the AFM passing air is the forward direction at step 102 and then, the routine proceeds to step 103 of FIG. 8, it is judged that the change rate $\Delta FR(k)$ of the AFM passing air flow rate calculated at step 101 is larger than a predetermined positive change rate $\Delta FRfith$ ($\Delta FR(k)>\Delta FRfith$). When it is judged that $\Delta FR(k)>\Delta FRfith$, the routine proceeds to step 104. On the other hand, when it is judged that $\Delta FR(k) \leq \Delta FRfith$, the routine proceeds to step 109. In the case where the AFM passing air flow rate increases when the routine proceeds to step 103, the change rate $\Delta FR(k)$ of the AFM passing flow rate calculated at step 101 and the predetermined change rate $\Delta FRfith$ used at step 103 are positive and therefore, when it is judged that $\Delta FR(k)>\Delta FRfith$ at step 103, the flow rate of the AFM passing air flowing in the forward direction increases relatively largely and on the other hand, when it is judged that $\Delta FR(k) \leq \Delta FRfith$ at step 103, the flow rate of the AFM passing air flowing in the forward direction does not increases relatively largely. The predetermined change rate $\Delta FRfith$ used at step 103 is set as a value near zero. However, in place of this predetermined change rate $\Delta FRfith$, zero may be employed.

When it is judged that $\Delta FR(k)>\Delta FRfith$ at step 103 and then, the routine proceeds at step 104, it is judged if the flow direction of the AFM passing air at this time performance of this routine is the forward direction just after the direction has changed from the backward direction to the forward direction. When it is judged that the flow direction of the AFM passing air is the forward direction just after the direction has changed from the backward direction to the forward direction, the routine proceeds to step 105. On the other hand, when it is judged that the flow direction of the AFM passing air is not the forward direction just after the direction has changed from the backward direction to the forward direction (i.e. the flow direction of the AFM passing air has been already the forward direction at the last time performance of this routine), the routine proceeds to step 107. At step 104, when the AFM passing air flow rate $FR(k-2)$ at the performance just before the last time performance acquired at step 100 is negative, it is judged that the flow direction of the AFM passing air is the forward direction just after the flow direction has changed from the backward direction to the forward direction and on the other hand, when the AFM passing air flow rate $FR(k-2)$ is positive, it is judged that the flow direction of the AFM passing air is not the forward direction just after the flow direction has changed from the backward direction to the forward direction.

When it is judged that the flow direction of the AFM passing air is the forward direction just after the flow direction has changed from the backward direction to the forward direction at step 104 and then, the routine proceeds to step 105, the backward-forward direction increase coefficient KBFi is acquired from the map of FIG. 5(C) on the basis of the last time AFM passing air flow rate $FR(k-1)$ acquired at step 100 and the change rate $\Delta FR(k)$ of the AFM passing air flow rate calculated at step 101. Next, at step 106, the coefficient KBFi acquired at step 105 is input to a final correction coefficient K and then, the routine proceeds to step 113 of FIG. 9.

On the other hand, when it is judged that the flow direction of the AFM passing air is not the forward direction just after the flow direction has changed from the backward direction to the forward direction and then, the routine proceeds to step 107, the forward direction increase condition correction coefficient KFi is acquired from the map of FIG. 5(A) on the basis of the last time AFM passing air flow rate $FR(k-1)$ acquired at step 100 and the change rate $\Delta FR(k)$ of the AFM passing air flow rate calculated at step 101. Next, at step 108, the coefficient KFi acquired at step 107 is input to the final correction coefficient K and then, the routine proceeds to the step 113 of FIG. 9.

On the other hand, when it is judged that $\Delta FR(k)=\leq \Delta FRfith$ at step 103 and then, the routine proceeds to step 109, it is judged if the change rate $\Delta FR(k)$ calculated at step 101 is smaller than a predetermined negative change rate $\Delta FRfdth$ ($\Delta FR(k)<\Delta FRfdth$). When it is judged that $\Delta FR(k)<\Delta FRfdth$, the routine proceeds to step 110. On the other hand, when it is judged that $\Delta FR(k) \geq \Delta FRfdth$, the routine proceeds to step 112. In the case where the AFM passing air flow rate decreases when the routine proceeds to step 109, the change rage $\Delta FR(k)$ of the AFM passing air flow rate calculated at step 101 and the predetermined change rate ΔFRfdth used at step 109 are negative and therefore, when it is judged that ΔFR(k)<ΔFRfdth at step 109, the AFM passing air flow rate decreases relatively largely and on the other hand, when it is judged that ΔFR(k)≥ΔFRfdth at step 109, the AFM passing air flow rate does not decrease at least relatively largely. The predetermined change rate ΔFRfdth used at step 109 is set to a value near zero. However, in place of this predetermined change rate ΔFRfdth, zero may be employed.

When it is judged that ΔFR(k)<ΔFRfdth at step 109 and then, the routine proceeds to step 110, the forward direction decrease condition correction coefficient KFd is acquired from the map of FIG. 5(B) on the basis of the last time AFM passing air flow rate FR(k−1) acquired at step 100 and the change rate ΔFR(k) of the AFM passing air flow rate calculated at step 101. Next, at step 110, the coefficient KFd acquired at step 110 is input to the final correction coefficient K and then, the routine proceeds to step 113 of FIG. 9.

Figure 9:
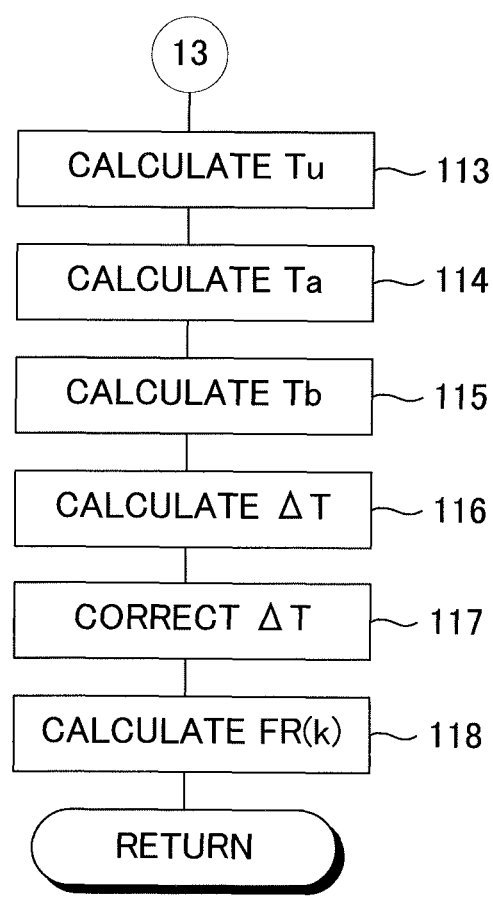
FIG. 9 is a view showing a portion of the example of the routine for performing the calculation of the AFM passing air flow rate according to the embodiment of the invention.

On the other hand, when it is judged that ΔFR(k)≥ΔFRfdth (i.e. it is judged that the change of the AFM passing air flow rate is small) at step 109 and then, the routine proceeds to step 112, "1" is input to the final correction coefficient K and then, the routine proceeds to step 113 of FIG. 9.

Figure 7:
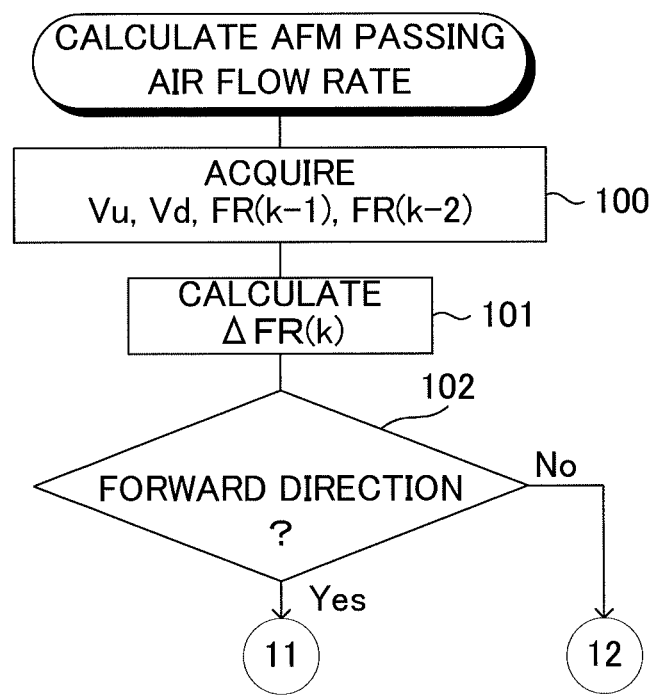
FIG. 7 is a view showing a portion of an example of a routine for performing a calculation of the AFM passing air flow rate according to the embodiment of the invention.
Figure 10:
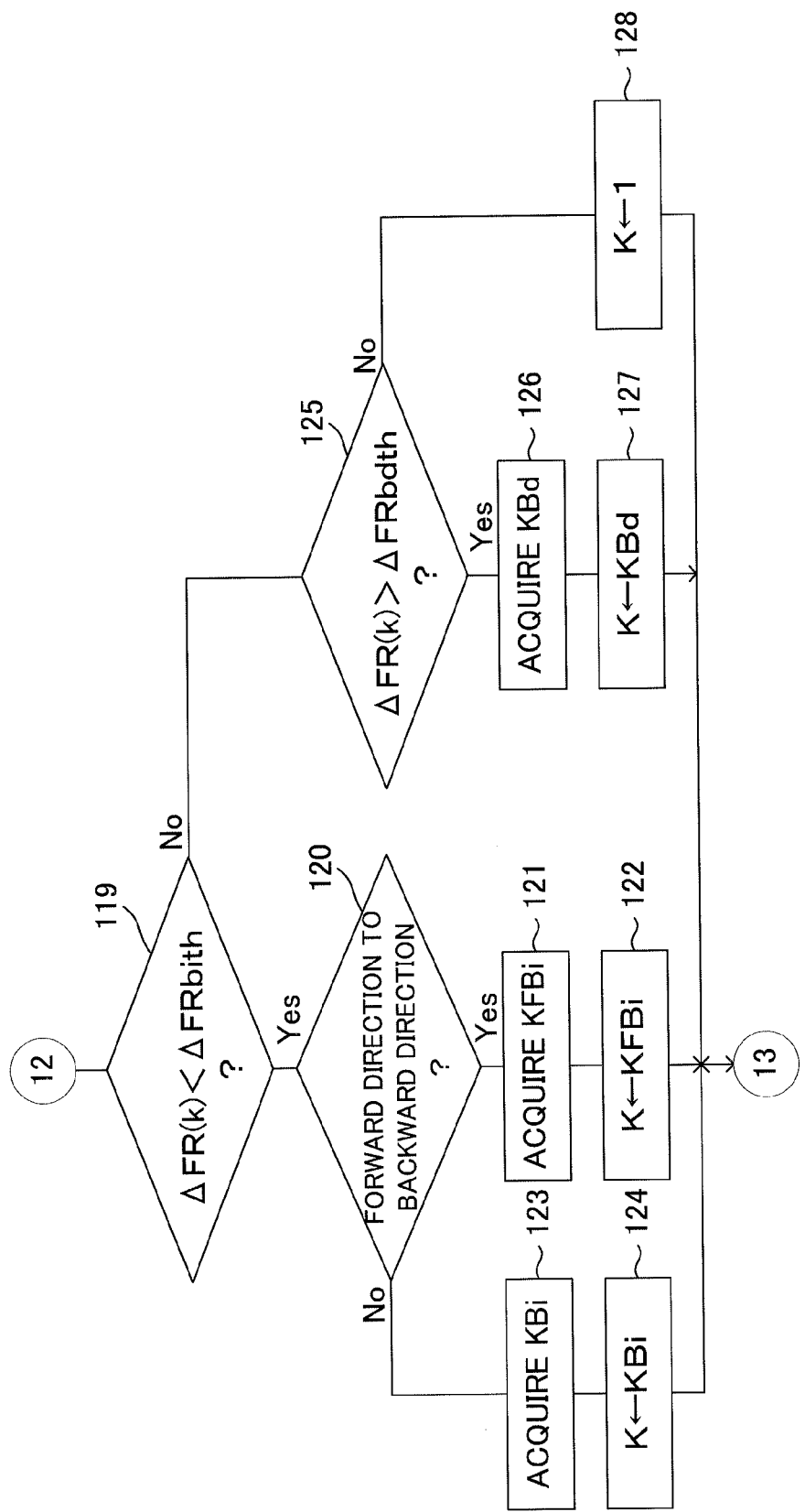
FIG. 10 is a view showing a portion of the example of the routine for performing the calculation of the AFM passing air flow rate according to the embodiment of the invention.

On the hand, when it is judged that the flow direction of the AFM passing air is not the forward direction (i.e. is the backward direction) at step 102 of FIG. 7 and then, the routine proceeds to step 119 of FIG. 10, it is judged if the change rate ΔFR(k) calculated at step 101 is smaller than a predetermined negative change rate ΔFRbith (ΔFR(k)<ΔFRbith). When it is judged that ΔFR(k)<ΔFRdith, the routine proceeds to step 120. On the other hand, when it is judged that ΔFR(k)≥ΔFRbith, the routine proceeds to step 125. In the case where the AFM passing air flow rate increases when the routine proceeds to step 119, the change rate ΔFR(k) calculated at step 101 and the predetermined change rate ΔFRbith used at step 110 are negative and therefore, when it is judged that ΔFR(k)<ΔFRbith at step 119, the flow rate of the AFM passing air flowing in the backward direction increases relatively largely and on the other hand, when it is judged that ΔFR(k)≥ΔFRbith at step 119, the flow rate of the AFM passing air flowing in the backward direction does not increase relatively largely. The predetermined rate ΔFRbith used at step 119 is set as a value near zero. However, in place of this predetermined change rate ΔFRbith, zero may be employed.

When it is judged that ΔFR(k)<ΔFRbith at step 119 and then, the routine proceeds to step 120, it is judged if the flow direction of the AFM passing air at this time performance of this routine is the backward direction just after the flow direction has changed from the forward direction to the backward direction. When it is judged that the flow direction is the backward direction just after the flow direction has changed from the forward direction to the backward direction, the routine proceeds to step 121. On the other hand, when it is judged that the flow direction is not the backward direction just after the flow direction has changed from the forward direction to the backward direction (i.e. the flow direction has been already the backward direction at the last time performance of this routine), the routine proceeds to step 123. At step 120, when the flow rate FR(k−2) acquired at step 100 is positive, it is judged that the flow direction of the AFM passing air is the backward direction just after the flow direction has changed from the forward direction to the backward direction and on the other hand, when the flow rate FR(k−2) is negative, the flow direction is not the backward direction just after the flow direction has changed from the forward direction to the backward direction.

When it is judged if the flow direction of the AFM passing air is the backward direction just after the flow direction has changed from the forward direction to the backward direction at step 120 and then, the routine proceeds to step 121, the forward-backward direction increase condition correction coefficient KFBi is acquired from the map of FIG. 6(C) on the basis of the flow rate FR(k−1) acquired at step 100 and the change rate ΔFR(k) calculated at step 101. Next, at step 122, the coefficient KFBi acquired at step 121 is input to the final correction coefficient K and then, the routine proceeds to step 113 of FIG. 9.

On the other hand, when it is judged that the flow direction is not the backward direction just after the flow direction has changed from the forward direction to the backward direction at step 120 and then, the routine proceeds to step 123, the backward direction increase condition correction coefficient KBi is acquired from the map of FIG. 6(A) on the basis of the flow rate FR(k−1) acquired at step 100 and the change rate ΔFR(k) calculated at step 101. Next, at step 124, the coefficient KBi acquired at step 107 is input to the final correction coefficient K and then, the routine proceeds to step 113 of FIG. 9.

When it is judged that ΔFR(k)≥ΔFRbith at step 119 and then, the routine proceeds to step 125, it is judged if the change rate ΔFR(k) calculated at step 101 larger than a predetermined positive change rate ΔFRbdth (ΔFR(k)>ΔFRbdth). When it is judged that ΔFR(k)>ΔFRbdth, the routine proceeds to step 126. On the other hand, when it is judged that ΔFR(k)≤=ΔFRbdth, the routine proceeds to step 128. In the case where the AFM passing air flow rate decreases when the routine proceeds to step 125, the change rate ΔFR(k) calculated at step 101 and the predetermined change rate ΔFRbdth used at step 125 are positive and therefore, when it is judged that ΔFR(k)>ΔFRbdth at step 125, the AFM passing air flow rate decreases relatively largely and on the other hand, when it is judged that ΔFR(k)≤ΔFRbdth at step 125, the AFM passing air flow rate does not decrease at least relatively largely. The predetermined change rate ΔFRbdth used at step 125 is set as a value near zero. However, in place of this predetermined change rate ΔFRbdth, zero may be employed.

When it is judged that ΔFR(k)>ΔFRbdth at step 125 and then, the routine proceeds to step 126, the backward direction decrease condition correction coefficient KBd is acquired from the map of FIG. 6(B) on the basis of the flow rate FR(k−1) acquired at step 100 and the change rate ΔFR(k) calculated at step 101. Next, at step 127, the coefficient KBd acquired at step 126 is input to the final correction coefficient K and then, the routine proceeds to step 133 of FIG. 9.

On the other hand, when it is judged that ΔFR(k)≤ΔFRbdth at step 125 (i.e. it is judged that the change of the AFM passing air flow rate is small) and then, the routine proceeds to step 128, "1" is input to the final correction coefficient K and then, the routine proceeds to step 133 of FIG. 9.

When the routine proceeds to step 133 of FIG. 9, the temperature Tu of the upstream portion 13U of the heating resistor element is calculated on the basis of the output value Vd acquired at step 100. Next, at step 114, the temperature Ta of the air passing the upstream temperature detection element 12U is calculated on the basis of the output value Vu of the upstream temperature detection element 12U acquired at step 100. Next, at step 115, the base temperature Tb is calculated on the basis of the temperature Ta calculated at step 114. Next, at step 116, the difference ΔT of the temperature Tu of the upstream portion 13U calculated at step 113 relative to the base temperature Tb calculated at step 115 (i.e. the element temperature difference) is calculated.

Next, at step 117, the element temperature difference ΔT is corrected by multiply the difference ΔT calculated at step 116 by the final correction coefficient K. In this regard, when the routine proceeds to step 113 from step 106, the difference ΔT calculated at step 116 is multiplied by the backward-forward direction increase condition correction coefficient KBFi, when the routine proceeds to step 113 from step 108, the difference ΔT is multiplied by the forward direction increase condition correction coefficient KFi, when the routine proceeds to step 113 from step 111, the difference ΔT is multiplied by the forward direction decrease condition correction coefficient KFd, when the routine proceeds to step 113 from step 122, the difference ΔT is multiplied by the forward-backward direction increase condition correction coefficient KFBi, when the routine proceeds to step 113 from step 124, the difference ΔT is multiplied by the backward direction increase condition correction coefficient KBi and when the routine proceeds to step 113 from step 127, the difference ΔT is multiplied by the backward direction decrease condition correction coefficient KBd. When the routine proceeds to step 113 from step 112 or 128, the difference ΔT is multiplied by "1" and therefore, the difference ΔT is not substantially corrected.

Next, at step 118, the AFM passing air flow rate FR(k) is calculated on the basis of the difference ΔT corrected at step 117 and then, the routine is terminated.

The invention claimed is:

1. A flow rate detection device comprising a flow rate meter for outputting an output value, depending on a flow rate of a gas, the device detecting the gas flow rate by calculating the gas flow rate on the basis of the output value output from the flow rate meter, wherein it is judged if the output value output from the flow rate meter should be corrected on the basis of the flow rate of the gas passing through the flow rate meter and the change rate of the flow rate and when it is judged that the output value output from the flow rate meter should be corrected, the output value output from the flow rate meter is corrected and then, the gas flow rate is calculated on the basis of the corrected output value, wherein it is judged if the condition of the gas passing through the flow rate meter has changed from the laminar condition to the turbulent condition or vice versa or the flow direction of the gas passing through the flow rate meter has inverted and then, when it is judged that the condition of the gas passing through the flow rate meter has changed from the laminar condition to the turbulent condition or vice versa or the flow direction of the gas passing through the flow rate meter has inverted, it is judged that the output value output from the flow rate meter should be corrected, wherein a point defined by the flow rate of the gas passing through the flow rate meter and its increase rate when the condition of the gas passing through the flow rate meter has changed from the laminar condition to the turbulent condition is previously obtained as a flow rate increase condition transition point and a point defined by the flow rate of the gas passing through the flow rate meter and its decrease rate when the condition of the gas passing through the flow rate meter is previously obtained as a flow rate decrease transition point, wherein when the flow rate of the gas passing through the flow rate meter, it is judged if the point defined by the flow rate and its increase rate is the flow rate increase condition transition point and when it is judged that the point defined by the flow rate of the gas passing through the flow rate meter and its increase rate is the flow rate increase condition transition point, it is judged that the condition of the gas passing through the flow rate meter has changed from the laminar condition to the turbulent condition, and wherein when the flow rate of the gas passing through the flow rate meter decreases, it is judged if the point defined by the flow rate and its decrease rate is the flow rate decrease condition transition point and when the point defined by the flow rate of the gas passing through the flow rate meter and its decrease rate is the flow rate decrease condition transition point, it is judged that the condition of the gas passing through the flow rate meter has changed from the turbulent condition to the laminar condition.

2. The device as set forth in claim 1, wherein a relationship between the output value output from the flow rate meter and the current gas flow rate when the change rate of the gas flow rate is zero or generally zero is previously obtained, and wherein the gas flow rate is calculated from the previously obtained relationship on the basis of the output value output from the flow rate meter or the corrected output value.

3. The device as set forth in claim 1, wherein the correction degree of the output value output from the flow rate meter when the output value is corrected is determined, depending on at least one of the flow rate of the gas passing through the flow rate meter and the change rate of the flow rate.

4. The device as set forth in claim 1, wherein the first order lag is eliminated from the output value output from the flow rate meter before the output value is corrected, the output value after its first order lag is eliminated, is corrected when it is judged that the output value output from the flow rate meter should be corrected, and the gas flow rate is calculated on the basis of the corrected output value.

5. The device as set forth in claim 1, wherein the flow rate meter is a silicon chip type flow rate meter.

6. The device as set forth in claim 1, wherein the flow rate meter has a heating resistor which generates a heat by the application of the electric voltage to the resistor, wherein the electric voltage is applied to the resistor, depending on the heat amount removed from the resistor by the gas passing through the flow rate meter, and wherein the output value is output, depending on the heat amount removed from the resistor by the gas passing through the flow rate meter.

* * * * *